(12) United States Patent
Miller

(10) Patent No.: US 7,967,988 B1
(45) Date of Patent: Jun. 28, 2011

(54) METHOD FOR TREATMENT OF WASTE LATEX

(75) Inventor: Francis C. Miller, Livonia, NY (US)

(73) Assignee: Innovative Environmental Products, Inc., Livonia, NY (US)

( * ) Notice: Subject to any disclaimer, the term of this patent is extended or adjusted under 35 U.S.C. 154(b) by 514 days.

(21) Appl. No.: 11/968,240

(22) Filed: Jan. 2, 2008

Related U.S. Application Data

(60) Provisional application No. 60/883,315, filed on Jan. 3, 2007.

(51) Int. Cl.
*C02F 1/56* (2006.01)
*C02F 11/14* (2006.01)
(52) U.S. Cl. ........ 210/666; 210/667; 210/694; 210/710; 210/727; 210/780; 210/930
(58) Field of Classification Search .................... 210/727
See application file for complete search history.

(56) References Cited

U.S. PATENT DOCUMENTS

| | | | |
|---|---|---|---|
| 3,726,794 A * | 4/1973 | Scott | 210/104 |
| 4,096,061 A | 6/1978 | Brennan | |
| 4,401,574 A * | 8/1983 | Farrington et al. | 210/728 |
| 4,456,534 A * | 6/1984 | Lambert et al. | 210/725 |
| 4,582,627 A | 4/1986 | Carlsson | |
| 4,670,158 A * | 6/1987 | Kelly | 210/705 |
| 4,849,128 A | 7/1989 | Timmons et al. | |
| 4,871,454 A | 10/1989 | Lott | |
| 5,006,639 A | 4/1991 | Tono et al. | |
| 5,093,008 A * | 3/1992 | Clifford, III | 210/725 |
| 5,147,557 A | 9/1992 | Purnell | |
| 5,147,558 A | 9/1992 | Purnell | |
| 5,236,598 A | 8/1993 | Hunter et al. | |
| 5,240,509 A | 8/1993 | Rey et al. | |
| 5,250,189 A * | 10/1993 | Rey | 210/712 |
| 5,587,086 A | 12/1996 | Danda et al. | |
| 5,595,654 A | 1/1997 | Caughman, Jr. | |
| 5,614,092 A * | 3/1997 | Di Leo | 210/350 |
| 6,036,935 A | 3/2000 | Dulko | |
| 6,059,978 A * | 5/2000 | Pacifici et al. | 210/727 |

(Continued)

OTHER PUBLICATIONS

Printed PDF version of Idee & Prodotti corporation web page with product information on the "Squeeze Box" filter at http://www.ideeeprodotti.com/eng/p_squeeze.htm. Exact Internet publication date unknown; approximately Sep. 2006 or earlier.

Printed PDF version of Idee & Prodotti corporation web page with product information on the "Dry Box 200" filter at http://www.ideeeprodotti.com/eng/p_drybox200.htm. Exact Internet publication date unknown; approximately Sep. 2006 or earlier.

(Continued)

*Primary Examiner* — Peter A Hruskoci
(74) *Attorney, Agent, or Firm* — John M. Hammond; Patent Innovations LLC

(57) ABSTRACT

A method and a apparatus for treating a liquid volume containing latex waste, the method comprising providing a treatment apparatus comprising at least a first vessel, and a filtration system in liquid communication with the first vessel; delivering a portion of the liquid containing waste latex to the first vessel; adding a first reagent to the portion of liquid containing waste latex to cause the formation of waste latex flocs of a first size; adding a second reagent to the portion of liquid containing waste latex to cause growth of the waste latex flocs of the first size into separable waste latex flocs; separating the separable waste latex flocs within the filtration system into a waste latex sludge and a first filtrate; and dewatering the waste latex sludge to produce a waste latex solid and a second filtrate. The filtrates may be reusable in a latex manufacturing process.

22 Claims, 5 Drawing Sheets

U.S. PATENT DOCUMENTS

| | | | |
|---|---|---|---|
| 6,110,374 | A | 8/2000 | Hughes |
| 6,190,569 | B1 | 2/2001 | Parker |
| 6,485,656 | B1 | 11/2002 | Meyer et al. |
| 6,699,389 | B1 | 3/2004 | Jochle et al. |
| 6,858,093 | B2 | 2/2005 | Albu et al. |
| 6,926,832 | B2 | 8/2005 | Collins et al. |
| 7,300,585 | B1 * | 11/2007 | Holzwarth et al. ........... 210/666 |
| 7,468,137 | B2 * | 12/2008 | Kojima et al. ................ 210/705 |
| 2002/0074295 | A1 | 6/2002 | Cohen et al. |
| 2004/0124154 | A1 | 7/2004 | Weir et al. |
| 2005/0061750 | A1 | 3/2005 | Fabri et al. |
| 2005/0279710 | A1 | 12/2005 | Clemons, Sr. |
| 2006/0196834 | A1 | 9/2006 | Nichols et al. |

OTHER PUBLICATIONS

Printed PDF version of Idee & Prodotti corporation web page with product information on the "Dry Box 15000" filter at http://www.ideeeprodotti.com/eng/p_drybox.htm. Exact Internet publication date unknown; approximately Sep. 2006 or earlier.

Printed PDF version of Flo Trend Systems Inc. web page with product information on the "Sludge Mate" filter at http://www.flotrend.com/sludgemate.html. Exact Internet publication date unknown; approximately Sep. 2006 or earlier.

Printed PDF of the Filing Receipt, specification, and drawings of the applicant Francis C. Miller's co-pending and commonly owned U.S. Appl. No. 12/035,492, Method and Apparatus for Treatment of Agricultural Waste, filed Feb. 22, 2008.

* cited by examiner

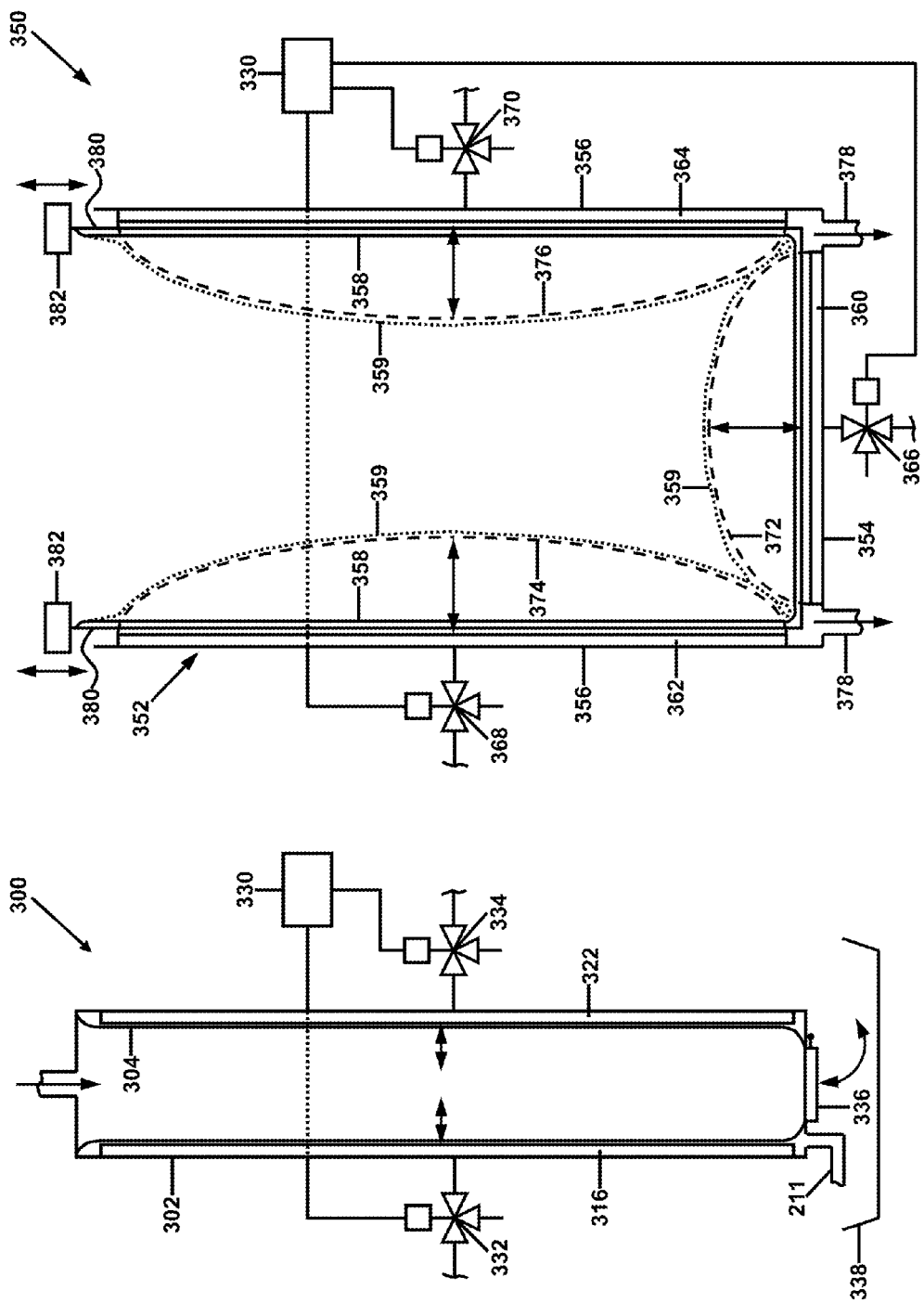

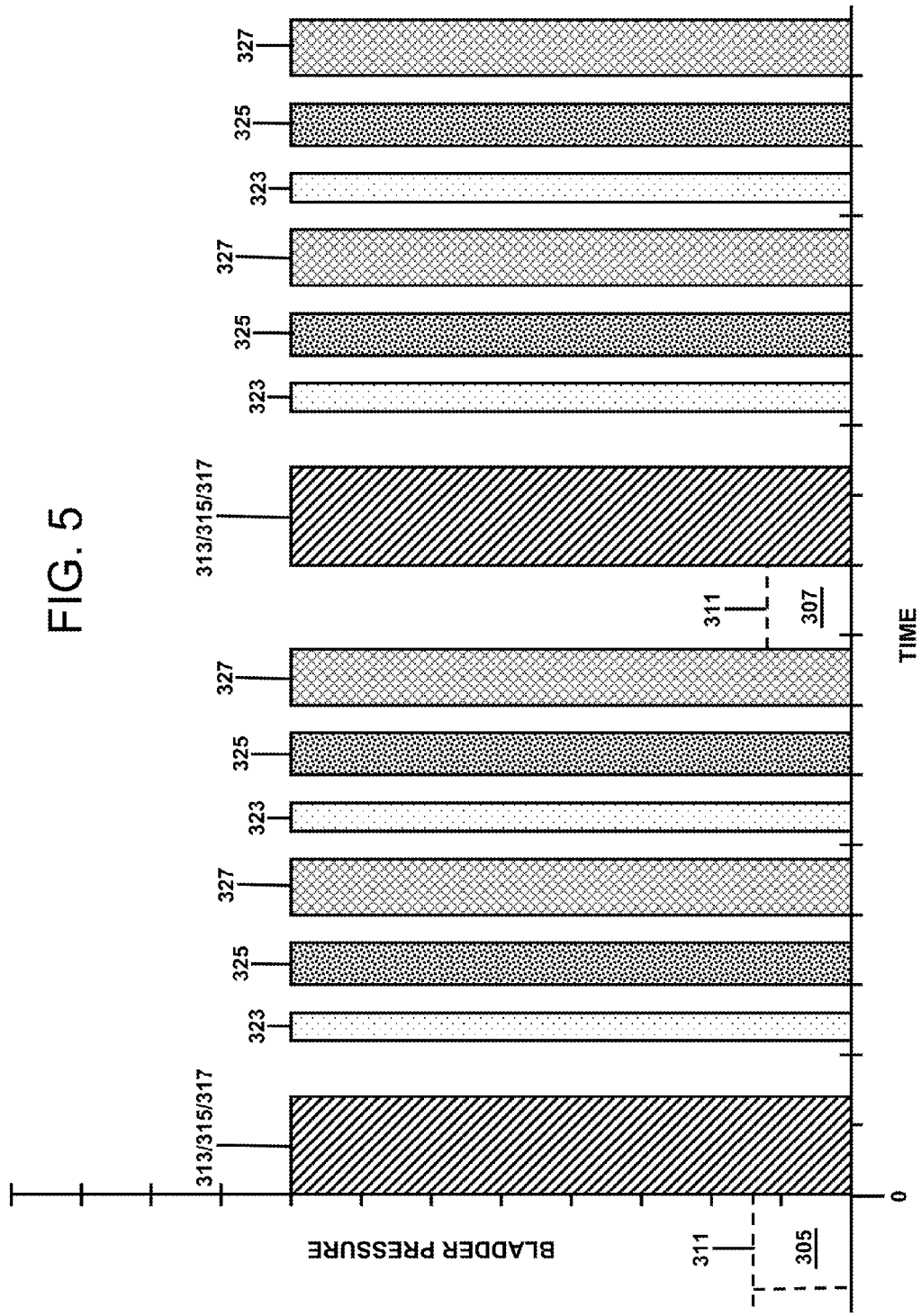

METHOD FOR TREATMENT OF WASTE LATEX

CROSS-REFERENCE TO RELATED PATENT APPLICATIONS

This application claims priority from the applicant's U.S. provisional patent application Ser. No. 60/883,315 filed Jan. 3, 2007. The disclosure of this provisional patent application is incorporated herein by reference.

This invention relates in one embodiment to a method for treatment of a waste treatable organic emulsion from a liquid mixture, and more particularly to separation and dewatering of waste latex from an aqueous liquid mixture.

BACKGROUND OF THE INVENTION

1. Field of the Invention

Processes and apparatus for separation of waste latex from liquid waste streams in latex paint manufacturing, latex coating of paper, latex adhesive manufacturing, and any other application generating aqueous latex waste. The process is useful for the recovery of the latex solids and the clarified filtrate for reuse, recovery or more efficient disposal thereof.

2. Description of Related Art

Latex paints, coatings and adhesives are used in a wide variety of residential, commercial, and industrial applications in which protective and/or decorative coatings are needed on interior and exterior structures as well as on papers and paper or film products. Recent federal and state environmental regulations have mandated reductions in the volatile organic content (VOC) of paints and other coatings. The use of latex paints and coatings is considered to be advantageous because the primary vehicle in a latex paint is water. The VOC of a latex paint is minimal compared to an "oil based" paint, in which the primary vehicle consists mainly of aliphatic and/or aromatic hydrocarbons.

Although the use of latex paint is advantageous from an environmental and health standpoint, the manufacture of latex paint and other latex emulsions does have problems to be addressed. In latex paint, coating, and adhesive manufacturing, a variety of liquid wastes containing emulsified latex are produced. The liquid waste may contain latex at a range of concentrations.

At certain points in the manufacturing process, in which the latex is highly concentrated as "liquid latex", a batch may be considered "out of spec" with respect to quality metrics, and must be discarded. Liquid latex may be between about 50 to about 70 weight percent solids of latex. At other points in the manufacturing process, manufacturing errors or batch "ends" may occur, resulting in the production of material generally referred to as "latex waste solution." This latex waste solution may be between about 30 to about 40 weight percent solids of latex. Finally, during the cleaning of vessel, piping, and other material handling equipment, waste liquid is produced as "latex wash solution." This liquid waste may be between about 3 to about 20 weight percent solids of latex.

These waste streams may be mixed together within the manufacturing plant to produce a single batch or liquid latex waste, or they may be maintained as separate wastes. In either case, a significant volume of liquid latex waste is produced in a latex paint, latex coating or adhesive manufacturing operation or a latex industrial use. Although latex waste is considered to be "environmentally friendly" and of low toxicity compared to oil-based paint waste, the discharge of such large volumes of latex waste to public sewers and natural waterways is prohibited by law.

Concentration of the latex by evaporation is not economically feasible. The energy cost to evaporate the water from the waste is too high, and following evaporative concentration, the remaining material left behind is a highly viscous sludge that is difficult to handle, and may still unacceptable for disposal in a landfill.

Processes and chemical treatment regimens for flocculation of latex paint waste streams are known. For example, U.S. Pat. No. 4,401,574, "Flocculation of Aqueous Paint Waste," of Farrington et al. discloses a process in which paint waste water containing dispersed paint solids is clarified by flocculating the solids with a basic poly aluminum chloride having the structural formula $Al_n(OH)_mCl_{3n-m}$, wherein n and m are integers and 3n is larger than m, and the basicity is from 30% to 83%. The disclosure of this United States patent is incorporated herein by reference.

In this patent, there is no detailed disclosure of a suitable process for filtration and dewatering of the floc resulting from the flocculation process; only the general statement, "If desired, the water content of the settled floc (sludge) can be further reduced by filtration or centrifugation." The floc that results from the process of Farrington et al. can be particularly difficult to handle in filtration and dewatering processes. The selection of a suitable filter and suitable operating conditions for satisfactory separation and dewatering of latex flocs has remained a problem in the industry.

What is needed is a low-cost process for treating liquid latex waste which can accept incoming waste at a range of concentrations, convert the latex to a solid phase, separate the solid phase from the liquid phase, dewater the solid phase to provide a solid material suitable for landfill disposal or recycling into another product or process stream, and render the liquid phase suitable for the industrial waste treatment process, or suitable for discharge to public sewers and/or waterways, or potentially recycling back into the manufacturing process with or without additional treatments.

SUMMARY OF THE INVENTION

The present invention meets this need by providing a method for treating a liquid containing waste latex. The method comprises providing a treatment apparatus comprising at least a first vessel, and a filtration system in liquid communication with the first vessel; delivering a portion of the liquid containing waste latex to the first vessel; adding a first reagent to the portion of liquid containing waste latex to cause the formation of waste latex flocs of a first size; adding a second reagent to the portion of liquid containing waste latex to cause growth of the waste latex flocs of the first size into separable waste latex flocs; separating the separable waste latex flocs within the filtration system into a waste latex sludge and a first filtrate; and dewatering the waste latex sludge to produce a waste latex solid and a second filtrate.

In one preferred embodiment, the first reagent is polyaluminum chloride, and the second reagent includes a cationic polymer. The method may further comprise adding a third reagent to the portion of liquid containing waste latex flocs to cause further growth of the separable waste latex flocs. The third reagent preferably includes an anionic polymer.

The method may operate in either a continuous mode, or a batch or semi-continuous mode, depending upon the configuration of the apparatus. To operate in a continuous mode, the first vessel of the apparatus is comprised of an elongated pipe through which flows the portion of the liquid containing waste latex. The first reagent is continuously injected into the elongated pipe through an injection port therein. To operate in a batch or semi-continuous mode, the first vessel of the apparatus is comprised of a tank. The portion of the liquid containing waste latex is delivered to the tank as a batch, and the first reagent is delivered to the tank and mixed with the portion of the liquid containing waste latex.

In one preferred embodiment, the filtration system is comprised of a first filter including a housing, a displaceable filter medium, and first and second sets of displacement actuators disposed between the housing and the displaceable filter medium. Dewatering of the waste latex sludge is performed by first manipulating the sludge by actuating the first set of displacement actuators, and then further manipulating the sludge by actuating the second set of displacement actuators. More effective dewatering of the waste latex sludge may be attained by manipulating the sludge by repeatedly alternately inflating the first set of displacement actuators, and then inflating the second set of displacement actuators two or more times. The displacement actuators may be pneumatically or hydraulically operated inflatable bladders. Manipulating the sludge may include compressing the sludge to "wring" liquid from it, and/or disrupting the sludge to form cracks in it, thereby forming channels that facilitate drainage of liquid from it.

The filtration system of the apparatus may be further comprised of a second filter in fluid communication with the first filter to receive the first filtrate. This filter is preferably a "polishing" filter, i.e. it retains any fine flocs of latex or other fine particle solids which may not have been captured by the first filter. The polishing filter may include a bed of activated carbon or ion exchange resin for separation of other impurities from the liquid, or such beds of materials may be located downstream of the first filter or downstream of the second filter.

Separating the separable waste latex flocs within the filtration system into a waste latex sludge and a first filtrate and dewatering the waste latex sludge to produce a waste latex solid and a second filtrate may be performed by delivering a first amount of the liquid containing separable waste latex flocs into the filter, dewatering the sludge from the first amount of liquid by actuating the first and second sets of displacement actuators, and then delivering a second amount of the liquid containing separable waste latex flocs into the filter, and dewatering the sludge from the second amount of liquid by actuating the first and second sets of displacement actuators. In like manner, third, fourth, fifth, etc. amounts of the liquid containing separable waste latex flocs may be delivered into the filter, subject to the capacity limitations thereof. In some instances, dividing the separable waste latex floc-containing liquid into multiple amounts and filtering and dewatering them in sequence results in more effective dewatering of the sludge.

The method preferably further comprises handling the flocs of the first size at sufficiently low shear rates to prevent the redispersion of the flocs into the liquid, and handling the separable waste flocs at sufficiently low shear rates to prevent size reduction of the separable waste flocs. The material handling operations in which low shear is maintained include liquid mixing, pumping, and pipe flow.

In addition to treating a liquid containing waste latex, at least one embodiment of the applicant's method may be applied more broadly to the treatment of certain other grease, oil or polymer emulsions, hereinafter referred to as treatable organic emulsions, to recover (or remove for more effective disposal) separated grease, oil or polymer solid therefrom and clarification of the filtrates (typically water) therefrom. This method may comprise providing a treatment apparatus comprising at least a first vessel, and a filtration system in liquid communication with the first vessel, the filtration system comprising a first filter including a housing, a displaceable filter medium, and first and second sets of displacement actuators disposed between the housing and the displaceable filter medium; delivering a portion of the liquid containing treatable organic emulsion to the first vessel; adding a first reagent to the portion of liquid containing treatable organic emulsion to cause the formation of treatable organic flocs; separating the treatable organic flocs within the filtration system into a treatable organic sludge and a first filtrate; and dewatering the treatable organic sludge to produce a treatable organic solid and a second filtrate by first manipulating the sludge by actuating the first set of displacement actuators, and then further manipulating the sludge by actuating the second set of displacement actuators.

Dewatering of the treatable organic sludge is performed by first manipulating the sludge by actuating the first set of displacement actuators, and then further manipulating the sludge by actuating the second set of displacement actuators. More effective dewatering the treatable organic sludge may be attained by manipulating the sludge by repeatedly alternately inflating the first set of displacement actuators, and then inflating the second set of displacement actuators two or more times.

The filter of the apparatus may be configured as either a "tower" or a box. In the latter embodiment, the housing of the first filter is formed as a box having a bottom wall and a surrounding side wall, the displaceable medium is a box-shaped bag, the first set of displacement actuators is disposed on the bottom wall of the box, and the second set of displacement actuators is disposed along the side wall of the box. In the "tower" embodiment, the housing of the first filter may be formed as an elongated cylinder or other suitable elongated shape, and the displaceable filter medium is formed as an elongated tubular bag.

The instant method for treatment of a treatable organic emulsion may be operated in either a continuous mode or a batch mode as recited previously for the waste latex treatment method.

In accordance with the present invention, there is further provided an apparatus for treating a liquid containing waste latex, or more generally, a semi-solid grease, oil, or polymer emulsion or other treatable organic emulsion. The apparatus is comprised of a first vessel; a filtration system in liquid communication with the first vessel, the filtration system comprising a first filter including a housing, a displaceable filter medium, and first and second sets of displacement actuators disposed between the housing and the displaceable filter medium; a source of a first reagent material in communication with the first vessel, the first reagent material reactable with the treatable organic emulsion to form first treatable organic flocs; and means for alternately actuating the first set of displacement actuators, and then the second set of displacement actuators of the first filter. The first set of displacement actuators of the first filter may be comprised of a first inflatable bladder, and the second set of displacement actuators of the first filter may be comprised of a second inflatable bladder. The filter may be configured as either a "tower" or a box, as described previously herein.

For operation in a continuous mode, the first vessel of the apparatus may be comprised of an elongated pipe through which flows the portion of the liquid containing treatable organic emulsion, and wherein the first reagent is continuously injected into the elongated pipe. For batch or semi-continuous mode operation, the first vessel may be comprised of a tank. The portion of the liquid containing treatable organic emulsion is thus delivered to the tank as a batch, and the first reagent is delivered to the tank and mixed with the portion of the liquid containing treatable organic emulsion.

The apparatus may further include a second vessel in liquid communication with the first vessel, and a source of a second reagent material in communication with the second vessel, the second reagent material reactable with the first treatable organic flocs to form second treatable organic flocs larger than the first treatable organic flocs. The apparatus preferably further includes material handling equipment such as mixers and pumps that operate at sufficiently low shear so as to not redisperse and/or reduce the size of flocs, as will be subsequently further described herein.

In accordance with the present invention, there is further provided an apparatus for treating a liquid containing waste latex, or more generally, a semi-solid grease, oil, or polymer emulsion or other treatable organic emulsion. The apparatus is comprised of a first vessel; a filtration system in liquid communication with the first vessel, the filtration system comprising a first filter including a box-shaped housing having a bottom wall and a surrounding side wall, a box-shaped displaceable filter medium, and a first set of displacement actuators disposed between the housing and the displaceable filter medium; a source of a first reagent material in communication with the first vessel, the first reagent material reactable with the waste latex to form first waste latex flocs of a first size; and means for actuating the first set of displacement actuators of the first filter.

In one embodiment of the latex treatment method, bulking agents may be added if required to enhance the formation of the flocs or to enhance the filterability. This is generally not required but development work has indicated that there may be a benefit in increasing the final solids of the dewatered sludge and/or decreasing the processing time through the use of such agents. These agents include but are not limited to diatomaceous earth, lime, cellulosic fibers, and the like.

The filtrate may be recycled back into the waste treatment apparatus as a diluent at certain points, or the filtrate may be used as a wash liquid in the paint, coating, or adhesive manufacturing process if the waste treatment and manufacturing processes are located proximate to each other.

The latex treatment method may further include the steps of adding a viscosity reducing reagent to the incoming volume containing latex waste, and/or adding a reagent to enable the recovery of dissolved metals such as copper and/or zinc.

One preferred filter for separating the liquid volume containing primary or final flocs into a sludge and a filtrate is a filter that forcibly squeezes or manipulates the sludge contained therein, thereby dewatering the sludge into a sufficiently dry mass to be suitable for landfill disposal or other end use or reuse. In one embodiment, the filtrate is sufficiently purified by use of a polishing filter to enable discharge thereof to public sewers or waterways, or recycling back to the manufacturing process should the primary filter not provide sufficient clarity in the filtrate. In another embodiment, the dewatered latex sludge is of sufficiently high solids concentration to form a latex solid that is easily discharged, handled, and/or further processed as a useful material. For example, the discharged latex solid may be utilized as a supplemental fuel when co-fired with conventional fossil fuel or other non conventional fuels, or as a single fuel under optimum conditions; or as a recycled pigment in the manufacture of paints or coatings; or as a filler or component of a composite material in concrete, polymer decking (a replacement for pressure treated wood), and other construction materials.

One aspect of the invention is based on the discovery that at certain points in the process, the flocs in the liquid volume are shear sensitive, i.e. high liquid shear rates cause the flocs to be broken down and redispersed, thereby rendering them difficult or impossible to economically separate in the filtration equipment. By providing material handling equipment such as pumps and mixers that operate at reduced liquid shear rates, size reduction and/or redispersing of the flocs is avoided in the material handling operations of mixing, pumping, and pipe flow, and flocs are thus produced that are more easily separated from the liquid volume.

Another aspect of the invention is based on the discovery that the steps of separating the liquid volume containing final flocs into a sludge and a filtrate, and dewatering the sludge are best performed by an "active filter" which first retains the solid flocs as a sludge upon a filter medium that is held in a fixed position while allowing a first portion of the filtrate to pass therethrough; and then forcibly squeezes and/or manipulates a second portion of the filtrate from the sludge contained therein by forcibly displacing the filter medium against the sludge in a squeezing or lifting action.

The use of an "active filter" to dewater the sludge is superior to other dewatering methods and filtration devices for several reasons. The active filtration process does not utilize high pressure or moving webs to apply the dewatering motive pressure to the sludge to achieve dewatering. The active filtration process utilizes air bladder inflation under a controlled sequence to optimize the separation of the liquid from the sludge. This helps to provide for less blinding of the filtration media and mitigation of blinding of the filtration fabrics with the latex sludge. The active filtration process may be fully automated and does not require manual operation of the equipment such as filter presses. The active filtration process requires significantly less energy than centrifuges, belt filter presses or vacuum drum filters. The active filtration process generally does not require the additional expense of purchasing, handling, processing, and disposing of bulking agents such as diatomaceous earth which is often required for a vacuum drum filtration or other filtration process. The level of discharged sludge solids concentration is easily adjustable within the active filtration process as may be required by the disposal method or end use. This is achieved by modification of the process parameters, such as air bladder operation, cycle time, etc. Furthermore, the applicant's chemical treatment regimen combined with the active filtration process provides for consistent and automatic discharging of the dewatered sludge in a detackified and easily handled form. To the best of the applicant's knowledge, this has not been consistently achievable in prior art technologies.

As a result of the invention, latex waste from a latex paint, coating and/or adhesive manufacturing process and/or paper and film coating processes can be treated in an economical and environmentally beneficial manner. In addition the byproducts of this process, the clarified filtrate and the dewatered solids, have potential beneficial re uses in the paint manufacturing process or in other industries.

BRIEF DESCRIPTION OF THE DRAWINGS

The invention will be described by reference to the following drawings, in which like numerals refer to like elements, and in which:

FIG. 3B is a second cross-sectional illustration of the filter of FIG. 3A taken along the line 3B-3B of FIG. 3A;

FIG. 4 is a schematic cross-sectional illustration of a "box" type filter that may be used in the present invention; and FIG. 5 is a schematic illustration of a portion of a sludge squeezing operation using the filter of FIG. 3.

Figure 1:
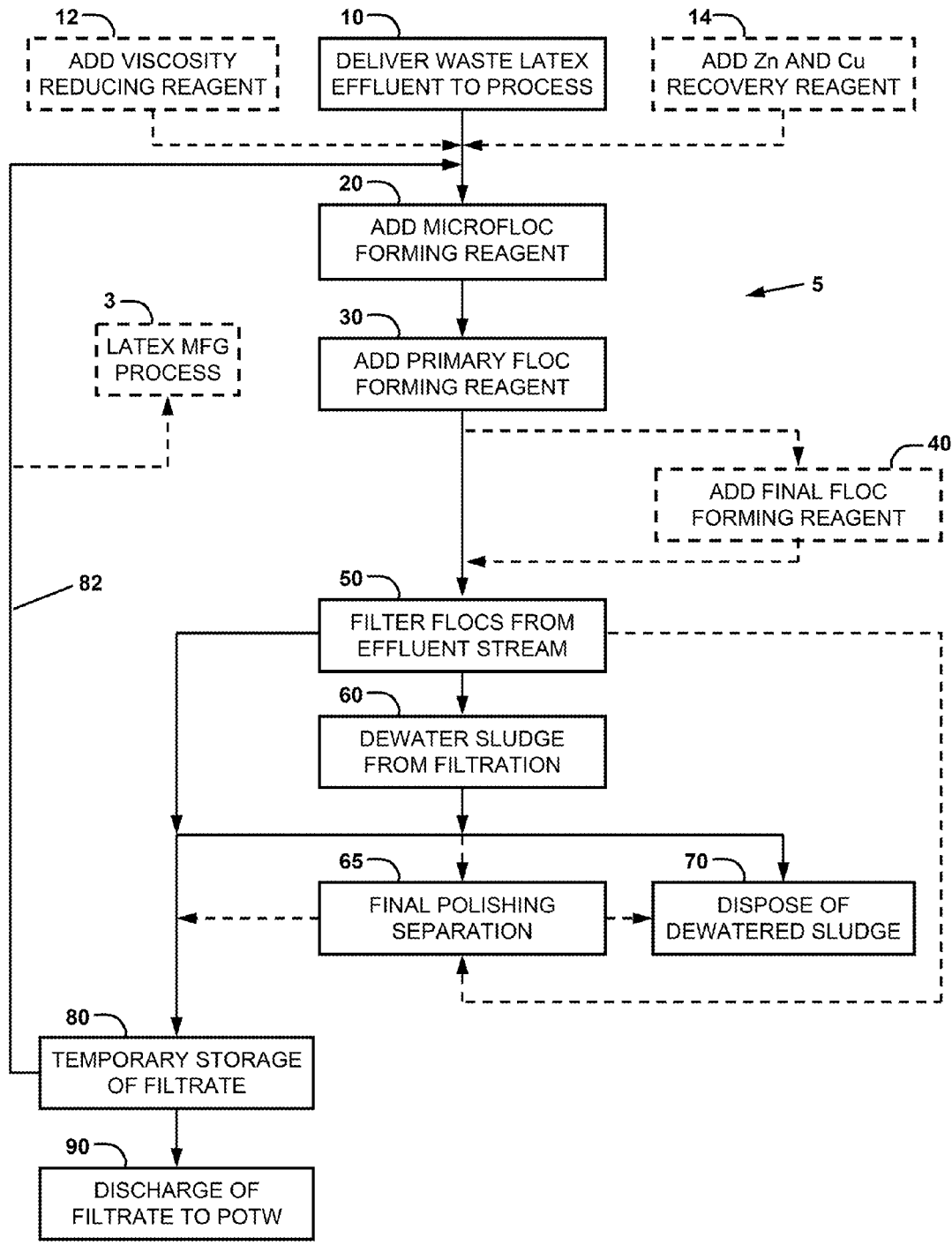
FIG. 1 is a general flowchart depicting steps of the latex waste treatment method of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements. In describing the present invention, a variety of terms are used in the description. Standard terminology is widely used in latex paint, coating, and adhesive and emulsion art.

As used herein, the term "latex" is meant to indicate synthetic latices including but not limited to styrene-butadiene copolymers (SBR), acrylonitrile-butadiene copolymers, polychloroprene, acrylic polymers, vinyl acetate polymers, vinyl acetate-ethylene polymers, vinyl chloride polymers and copolymers, polybutadiene and polyisoprene; as well as natural rubber latex.

As used herein, the term "waste latex" or "latex waste" is meant to indicate any latex waste stream produced by the normal or abnormal operation of a latex paint manufacturing plant, a latex adhesive manufacturing plant, a latex coating manufacturing plant, a plant involved in the latex coating of or painting of any substrate including but not limited to moving webs of paper or film or coating of construction materials.

The term "dewatered latex solids" as used herein is meant to indicate the dewatered solids resulting from the separation of the liquid from the sludge. This dewatered sludge may vary in concentration of solids from approximately but not limited to 20% up to approximately 90% dependent upon the ultimate disposition of the material.

As used herein, the term "latex paint" is meant to indicate a water-based emulsion of solid latex monomers and additives such as pigments. Additionally, the term "latex paint" as used herein is meant to include latex coatings and adhesives as well as paints. The latex paint is used for decorative, functional and/or protective coating of various objects and structures or other media.

As used herein, the term "POTW" is meant to indicate a Publicly Owned Treatment Works, i.e. any sewage or wastewater treatment system operated by a public agency.

The following description of the applicant's methods and apparatus, with reference to FIGS. 1-4 is provided in the context of treatment of waste latex in an aqueous liquid mixture. However, it is to be understood that the applicant's methods and apparatus are more broadly applicable to the treatment of a range of other liquid mixtures containing solids, and that treatments are to be considered within the scope of the present invention. The description with respect to the treatment of latex is meant to be exemplary and not limiting.

FIG. 1 is a general flowchart depicting steps of the applicant's latex waste treatment method. Referring to FIG. 1, method 5 comprises step 10, delivering a liquid containing waste latex to the treatment apparatus; step 20, adding a first reagent to the volume to produce a liquid volume containing waste latex flocs of a first size, and referred to herein as microflocs; step 30, adding a second reagent to the liquid volume containing microflocs to cause growth of the waste microflocs into separable waste latex flocs (further referred to herein as primary flocs) optional step 40, adding a third reagent to the liquid volume containing the separable flocs to cause further growth of the separable waste latex flocs, thereby producing a liquid volume containing "final" flocs; step 50, separating the liquid volume containing primary or final flocs into a sludge and a filtrate; and step 60, dewatering the sludge.

The filtrate may be placed in temporary storage in a holding vessel in step 80. From that point, the filtrate may be recycled back into the waste treatment apparatus as a diluent at certain points as indicated by line 82; or the filtrate may be used as a wash liquid in the paint manufacturing process 3 if the waste treatment and manufacturing processes are located proximate to each other; or the filtrate may be discharged to a POTW in step 90 or to an industrial waste water treatment plant.

The method may be performed as a continuous process, i.e. the liquid volume being treated flows continuously through liquid conduits and/or vessels as the reagents are added. Alternatively, the method may be performed as a semi-continuous or batch process in which the volume being treated flows intermittently from a waste holding vessel to one or more vessels for dilution and reagent addition.

The method may further include the step 12 of adding a viscosity reducing reagent to the incoming volume containing latex waste, and/or step 14 of adding a reagent to enable the removal of dissolved metals such as copper from the filtrate.

One preferred filter for performing step 50 of separating the liquid volume containing primary or final flocs into a sludge and a filtrate, and step 60 of dewatering the sludge is a filter that forcibly squeezes or manipulates the sludge contained therein, thereby dewatering the sludge into a sufficiently dry mass to be suitable for landfill disposal or other disposition or use. In one embodiment that includes step 65, the filtrate is sufficiently purified by use of a polishing filter to enable discharge thereof to a POTW, industrial waste water treatment plant or a waterway, or reuse, should the primary filtration equipment not provide sufficient clarity.

Figure 2:
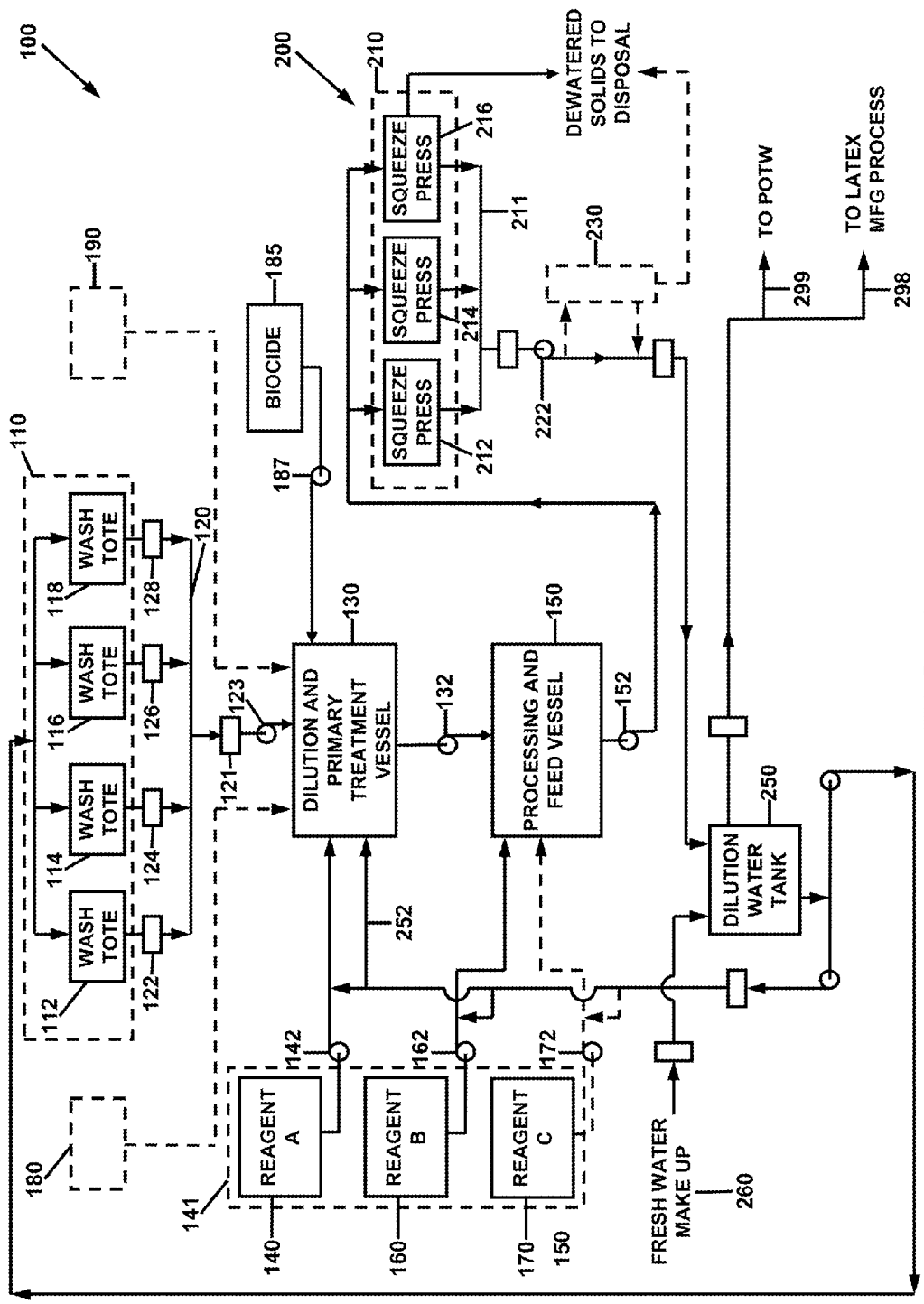
FIG. 2 is a schematic diagram of one embodiment of a latex waste treatment apparatus of the present invention.

FIG. 2 is a schematic diagram of one embodiment of a latex waste treatment apparatus that may be used to perform the waste treatment method 5. Liquid latex, latex waste solution, or latex wash solution may be delivered to apparatus 100 at a range of different concentrations. The apparatus 100 and method 5 of the present invention are capable of treating waste latex liquids containing from between about 5 to at least about 70 weight percent solids of latex, and in some instances, even higher or lower solids.

If the latex manufacturing or utilization process (not shown) and apparatus 100 are proximate to each other, the waste latex liquid may be delivered directly into dilution and primary treatment tank 130. In the embodiment depicted in FIG. 2, the waste latex liquid is collected in one or more wash totes 112/114/116/118, which are then transported to the location of apparatus 100. The wash totes 112 et seq. are preferably modular vessels configured for placement and removal from an elevated rack 110 by a suitable material handling device such as a lift. Totes 112/114/116/118 are connectable to valves 122/124/126/128 respectively, which are connected to common header 120, control valve 121, and pump 123. Valves 122/124/126/128 are controllable to allow for transfer of waste latex liquid from wash totes 112/114/116/118 either individually or in any combination of two or more of them. It will be apparent that other suitable means may be used to deliver waste latex liquid from the wash totes other than pump 123, such as gravity feed, or providing pressurizable wash totes to perform a pressure feed.

A batch of waste latex liquid is transferred from the wash totes into dilution and primary treatment vessel 130. The liquid in vessel 130 is diluted by water delivered through conduit 252 from dilution water tank 250. The water contained in dilution water tank 250 may include fresh water make up 260 from a facility water supply, and/or filtrate collected from previous waste latex liquid treatment(s). Dilution water is added to dilute the waste latex liquid to a required concentration range appropriate for the treatment. The dilution is performed in order to enhance the chemical performance of the reagents. The degree of enhancement is dependent upon the particular waste latex material, which varies in its specific chemical nature. Selection of the optimum concentration may be achieved through experimental observations of the response of the reagents at varying concentrations.

The reaction will proceed at nearly all levels of latex concentration; however, the greater the dilution of the latex in water the faster the reactions and subsequent flocculation will occur. The method of the present invention has been performed between 3 weight percent solids and 10 weight percent solids. 4.5 to 6 weight percent solids appears to provide satisfactory performance for most latices. Operating the process at higher percent solids would require proportionately longer contact times for the process, thereby requiring more or larger equipment to achieve the same throughput. Similarly, operating at lower percent solids would require more equipment to handle the larger, more dilute volume. For simplicity, it is preferable that all latices at any processing unit should be diluted to the same concentration to simplify downstream processing and matching of reagent additions. The applicant has determined that both acrylic and vinyl acrylic as well as oil fortified latex paints and coatings are quite similar in reagent requirements. Based upon experimental results, adhesive latices appear to require significantly less of all of the reagents in order to achieve flocculation.

Although apparatus 100 is operated as a batch or semi-continuous process as depicted in FIG. 2, in the event that the waste treatment process 5 is operated as a continuous process, the concentration of the latex solution may be controlled by dilution with water and utilization of a nuclear absorption concentration monitor or an ultrasonic flow and concentration monitor or any other suitable means for measuring solids concentration in a liquid. Thus in a continuous process, the dilution and primary treatment vessel 130 is replaced with an elongated pipe, an injection port for addition of the dilution water to the flowing waste latex liquid, and mixing means in the pipe if necessary. A solids concentration instrument may also be provided on or in the pipe for use in control of the addition of the dilution water to the waste latex liquid as described above.

Additionally, it is noted that although the apparatus 100 of FIG. 2 is depicted as including pumps at various locations to effect the transfer of liquids at various points, other suitable means or accommodations may be provided to accomplish the liquid transfers, For example, the apparatus could be arranged such that gravity feed is performed from various upstream points in the apparatus to downstream points. Alternatively or additionally, certain vessels could be sealed and pressurized to enable such transfers.

In a further embodiment, apparatus 100 may be provided with a source 180 of surfactant, which can be added to the waste latex liquid in vessel 130. The surfactant enhances the chemical performance of all of the reagents by reducing the viscosity of the waste solution. (The addition of surfactant is considered as step 12 in FIG. 1.) Without wishing to be bound to any particular theory, the applicant believes that the viscosity reduction results from a destabilization or other disruption of the latex emulsion.

In order to perform step 20 of method 5, apparatus 100 is provided with a source 140 of reagent A for producing microflocs of latex in vessel 130. In the preferred embodiment, reagent A is polyaluminum chloride (PAC), although alternatively, ferric chloride may also be suitable. (Other metal halides may also be suitable, but PAC and ferric chloride are the most commercially available reagents.) The PAC is provided as a liquid solution from source 140 via pump 142 to dilution vessel 130. Source 140 may be a holding vessel in which the solution is prepared, or source 140 may be a pre-packaged disposable container of solution that is connectable to pump 142. The concentration of the PAC reagent contained in source 140 is between about 1 to about 100 weight percent solids. Source 140 may be placed upon a rack 141, which may be elevated above vessel 130, such that the PAC reagent can be gravity fed into vessel 130. Source 160 of reagent B and source 170 of reagent C may also be located proximate to source 140 on rack 141.

In step 20 in which the microflocs of latex are formed in vessel 130, the concentration of the PAC in the waste latex-containing liquid is determined based upon the nature of the particular latex waste in the liquid to be treated. The concentration and delivered amount of PAC that is effective may be a function of the pH of the latex waste, which varies with the kind of latex being processed. Without wishing to be bound to any particular theory, the applicant believes that the optimum amount of PAC is also dependent upon the amount of charge present on the surface of the latex particles. Selection of the optimum amount may be achieved through experimental observation of the response of the reagents at varying concentrations.

Acrylic and vinyl acrylic latices appear to achieve optimum flocculation in at a PAC-to-latex solids ratio of approximately 0.2 pounds of PAC per pound of latex solids. In the case of latex adhesive, preliminary experimental work has demonstrated that a ratio of approximately 0.0013 pounds of PAC per pound of latex solids is effective.

Control of the PAC addition may be achieved by volumetric matching of flow or by pH control. Once the optimum PAC level is determined, the pH of the solution at the optimum solids concentration and the optimum PAC concentration will be a repeatable characteristic of that solution, i.e. that particular latex at a given concentration.

In using apparatus 100 to treat waste latex liquid, the addition of PAC is done in a batch mode in vessel 130. Alternatively, an apparatus may be provided to operate method 5 in a continuous mode. In such an embodiment, the PAC is injected into the waste latex liquid as it flows through a pipe. The pipe may be provided with a motionless mixer or other mixing means therein to achieve rapid mixing of the PAC with waste latex liquid. Thus in a continuous process, the dilution and primary treatment vessel 130 is replaced with an elongated pipe, an injection port for addition of the PAC to the flowing waste latex liquid, and mixing means in the pipe if necessary. A pH probe may also be provided in the pipe for use in control of the addition of the PAC to the waste latex liquid as described above.

The addition of the PAC to the waste latex liquid as described herein results in the formation of microflocs, which are also known as pin flocs. As used herein, the terms "microfloc" or "pin floc" are used interchangeably and are meant to indicate precipitated solid phase particles having a typically characteristic but not required dimension on the order of 20 to 100 microns. Stated alternatively, the size of the microflocs is at about the threshold of what is just barely visible to a typical human with 20-20 vision.

The applicant has observed that the pin floc produced by the addition of reagent A is apparently resistant to mechanical disruption due to shear, provided that extreme shear is not imparted for extended periods. Although the applicant has not quantified the upper limit of acceptable shear energy beyond which breakdown of the pin floc will occur, is considered optimum to avoid the use of high shear material handling devices such as centrifugal pumps and mixers having high impeller speeds in this phase of the process. Satisfactory pin floc stability appears to take place with mixer blade tip speeds in the range of about 2 to about 20 feet per second (fps), with the preferred range being about 4 to about 8 fps. Mixer blade tip speeds in the range of 20 to 30 fps appear to mechanically disrupt the floc over time. The applicant has observed that a typical mixing time is in the range of five to ten minutes to achieve the appropriate visible appearance of the micro flocs, indicating the desired floc size described subsequently herein.

The applicant has further observed that the extent of mixing and amount of contact time between the PAC and the waste latex does have an impact on the performance of the separation equipment. Without wishing to be bound to any particular theory, the applicant believes that inadequate mixing and or insufficient contact time between the PAC and the waste latex results in a more flexible dewatered solid, which is more difficult to discharge from the separation equipment and more susceptible to bleeding of fines through the filter medium (typically a filter cloth or fabric).

The method 5 may optionally comprise the additional step (not shown in FIG. 1) of adding one or more biocides to the solution in order to mitigate slime and bacteria growth in the process and in the sludge. In order to perform this step, apparatus 100 is provided with a source 185 of biocide, and a pump 187 or other suitable means for transferring the biocide to vessel 130.

It may also be necessary to remove copper, zinc, or other metals from the filtrate solution so that it may be treated in a POTW or other waste water treatment plant or reused in the manufacturing process. Thus the method 5 may optionally comprise the further step 14 of adding an another reagent for such removal. In one embodiment, caustic (NaOH) solution is added prior to the addition of the polyaluminum chloride to vessel 130, raising the pH of the liquid in vessel 130 to at least about 8.0. Apparatus 100 is provided with a source 190 of caustic solution, and a pump (not shown) or other suitable means for transferring the caustic to vessel 130.

In the event that the apparatus is configured for continuous processing of the latex waste liquid, the caustic can be injected into the pipeline as described previously for the polyaluminum chloride. The metals may be precipitated from the slurry as metal salts and may be removed from the filtrate with the latex sludge.

At this initial step of converting the waste latex into a separable solid phase, the pin floc is not filterable in a cost effective manner, nor will a solid collected in a filtration device be in a form that is easily dewatered and handled, rendering it suitable for disposal in a landfill. Further treatment steps are needed to obtain such a solid. Step 30 of method 5, the addition of a primary floc forming reagent is performed next.

In order to perform step 30 of method 5, apparatus 100 may be provided with a pump 132 for transferring the microfloc-containing liquid from dilution and primary treatment vessel 130 to processing and feed vessel 150. Pump 132 is preferably a peristaltic or progressing cavity pump, or another pump that subjects the fluid being transferred to minimal shear. Apparatus 100 is also provided with a source 160 of reagent B for producing primary flocs of latex in vessel 150. In the preferred embodiment, reagent B is a cationic polymer, and more preferably, a high molecular weight high charge cationic polymer, such as a linear cationic polyacrylamide. One example of a suitable material comprised of a cationic polyacrylamide is Drewfloc 2441 manufactured and sold by the Drew Industrial Division of the Ashland Corporation of Boonton, N.J. Other suitable cationic polymers will be apparent to those skilled in the art.

The cationic polymer, being water soluble, may be provided as a liquid solution from source 160 via pump 162 to processing vessel 150. Source 160 may be a holding vessel in which the cationic polymer solution is prepared, or source 160 may be a pre-packaged disposable container of solution that is connectable to pump 162. The concentration of the cationic polymer reagent contained in source 160 is preferably between about 0.25 to about 1.0 weight percent solids. Higher solids concentrations are higher in viscosity and somewhat more problematic in handling and dispensing. In addition the higher concentrations appear to result in a slower reaction time between the polymer and the microfloc.

In an alternative embodiment (not shown), the cationic polymer may be provided to the process as a solid in granular or pellet form. This would require a system for dissolution and dispersion of the solid into water or recycled filtrate prior to addition into the process.

In using apparatus 100 to treat waste latex liquid, the addition of cationic polymer is done in a batch mode in vessel 150. Alternatively, an apparatus may be provided to operate method 5 in a continuous mode. In such an embodiment, the cationic polymer is injected into the microfloc-containing liquid as it flows through a pipe. The pipe may be provided with a low-shear motionless mixer or other mixing means therein to achieve rapid mixing of the cationic polymer with waste latex liquid. Thus in a continuous process, the processing vessel 150 is replaced with an elongated pipe, an injection port for addition of the cationic polymer to the flowing microfloc-containing liquid, and mixing means in the pipe if necessary.

The addition of the cationic polymer to the microfloc containing liquid as described herein results in the formation of "primary floc," i.e. floc of a second, larger size that is cost-effectively separable from the liquid. The microfloc may be considered separable, given a filter medium having sufficiently small pores, and sufficient time to perform the filtration, but such a filtration is usually not cost-effective or desirable as compared to the use of a second reagent to produce the primary floc. As used herein, the term "primary floc" is meant to indicate solid phase particles that have a size larger than microflocs, having a characteristic appearance of small to medium curd cottage cheese, and a typically characteristic but not required dimension of between about 0.25 inches and about 0.5 inches.

The applicant has observed that in the processing of latex waste, the primary latex floc produced by the addition of reagent B is shear sensitive. It is necessary to minimize the exposure of this floc to shear forces found in conventional centrifugal and diaphragm pumps and high speed agitators. Progressing cavity and/or peristaltic pumps or any pump that imparts minimum shear forces into the solution provide suitable handling of the primary floc. Low speed flocculation mixers (not shown) or extended lengths of internally corrugated pipe or hose are preferred for the formation of the primary floc at this stage of the process. In one embodiment, the preferred length of 1.5 inch diameter internally corrugated hose has been determined to be about 20 feet, using a feed rate of five to seven gallons per minute. Higher feed rates may require larger diameter and or longer lengths of reaction conduit.

In step 30 in which the primary floc of latex is formed in vessel 150, the concentration of the cationic polymer is determined based upon the nature and concentration of the particular latex waste in the liquid to be treated. Acrylic and vinyl acrylic latices appear to achieve optimum flocculation at a cationic polymer to latex solids ratio of approximately 0.006 pounds of polymer per pound of latex solids. In the case of latex adhesive, preliminary experimental work has demonstrated that a ratio of approximately 0.00067 pounds of polymer per pound of latex solids is satisfactory.

At this intermediate step of converting the waste latex into a separable solid phase, the primary floc may still not be readily filterable in a cost effective manner. The primary floc may lack stability as it passes through the delivery system to and within the filtration equipment. An additional treatment step is preferred to obtain such a separable solid. Step 40 of method 5, the addition of a final floc forming reagent is performed next.

In order to perform step 40 of method 5, apparatus 100 is provided with a source 170 of reagent C for producing final flocs of latex in vessel 150. In the preferred embodiment, reagent C is an anionic polymer, and more preferably, a high molecular weight high charge anionic polymer, such as a linear anionic polyacrylamide. One example of a suitable material comprised of an anionic polyacrylamide is Drewfloc 2270 manufactured and sold by the Drew Industrial Division of the Ashland Corporation of Boonton, N.J. Other suitable anionic polymers will be apparent to those skilled in the art.

The anionic polymer, being water soluble, is provided as a liquid solution from source 170 via pump 172 to processing vessel 150. Source 170 may be a holding vessel in which the anionic polymer solution is prepared, or source 170 may be a pre-packaged disposable container of solution that is connectable to pump 172. The concentration of the anionic polymer reagent contained in source 170 is between about 0.2 to about 1.0 weight percent solids Higher solids concentrations are higher in viscosity and somewhat more problematic in handling and dispensing. Additionally, the higher concentrations appear to result in a slower reaction time between the polymer and the primary floc.

In an alternative embodiment (not shown), the anionic polymer may be provided to the process as a solid in granular or pellet form. This would require a system for dissolution and dispersion of the solid into water or recycled filtrate prior to addition into the process.

In using apparatus 100 to treat waste latex liquid, the addition of anionic polymer is done in a batch mode in vessel 150. Alternatively, an apparatus may be configured to operate in a continuous mode. In such an embodiment, the anionic polymer is injected into the primary floc-containing liquid as it flows through a pipe. The pipe may be provided with a low-shear motionless mixer or other mixing means therein to achieve rapid mixing of the anionic polymer with waste latex liquid. Thus in a continuous process, the processing vessel 150 is replaced with an elongated pipe that is downstream from the elongated pipe for formation of the primary floc, an injection port for addition of the anionic polymer to the flowing waste latex liquid, and mixing means in the pipe if necessary.

The addition of the anionic polymer to the primary floc containing liquid as described herein results in the formation of final floc. As used herein, the terms "final floc" is meant to indicate solid phase particles that have a size equal or larger than primary floc, having a characteristic shape of medium to large curd cottage cheese, and a typically characteristic but not required dimension of between about 0.25 inches and about 0.75 inches.

The applicant has observed that the final floc produced by the addition of reagent C is also shear sensitive, but not so much as the primary floc. It is thus necessary to minimize the exposure of this floc to shear forces found in conventional centrifugal and diaphragm pumps and high speed agitators. Progressing cavity and/or peristaltic pumps or any pump that imparts minimum shear forces into the solution also provide suitable handling of the final floc, and low speed flocculation mixers (not shown) are optimum for the formation of the final floc at this stage of the process.

In step 40 in which the final floc of latex is formed in vessel 150, the concentration of the anionic polymer is determined based upon the nature and concentration of the particular latex waste in the liquid to be treated. Acrylic and vinyl acrylic latices appear to achieve optimum flocculation in at a anionic polymer to latex solids ration of approximately 0.0136 pounds of polymer per pound of latex solids. In the case of latex adhesive, experimental work has indicated that a ratio of approximately 0.0013 pounds of polymer per pound of latex solids is an effective amount.

In general, optimum performance has been typically achieved about 0.25 weight percent and about 1.0 weight percent of anionic polymer applied to the vessel 130. Higher solids concentrations are higher in viscosity and somewhat more problematic in handling and dispensing. In addition, the higher concentrations appear to result in a slower reaction time between the polymer and the primary floc.

The final floc of latex contained in vessel 150, produced by the method and apparatus of the present invention are filterable in a cost effective manner, and can be collected in a filtration device in a form that is easily dewatered and handled, rendering it suitable for disposal in a landfill or other disposition. This is because the sequence of addition of PAC, then cationic polymer and finally anionic polymer provides for a floc of sufficient stability to be effectively dewatered in an active filtration separation device and provide a clear or nearly clear filtrate. The degree of clarity of the filtrate may be subject to the presence of fine particulate fillers that may be present within the paint or coating formulation. If the filtrate clarity is not optimal at the initiation of a separation cycle it (the clarity) improves as the individual fill cycle or cycles of the active filtration device progress. This is due to the build up of the filter cake within the active filtration device which improves the filtration efficiency as the cycle progresses. Should high clarity filtrate be required, a second filter 230 (FIG. 2) similar in form to the active filtration apparatus may be utilized, or a conventional filter may be used such as, but not limited to, a cartridge or bag filter. This second filter functions as a "polishing" filter to remove the majority of any remaining very fine solid particles from the filtrate to render it clear.

In an additional embodiment of the process, alum may be added to the process at some point to coagulate these fines for separation in the primary or polishing filtration equipment.

In an additional embodiment of the process, the filtrate may be treated as follows to achieve a high level of clarity prior to its introduction to a filtration device. The pH of the filtrate is elevated to above 9, and preferably to at least 10 utilizing caustic or other suitable alkaline material. The pH is then lowered to below 6, and preferably below 4.8 utilizing PAC and/or alum. The filtrate is then treated with cationic polymer followed by anionic polymer in a manner similar to that describe previously herein for the original waste latex-containing liquid. As in the case of the waste latex, the filtrate is preferably exposed to minimal shear forces. Once the polymers are added, the filtrate is provided a reaction period of about five to ten minutes during which there is laminar flow and/or sedimentation. The laminar flow may take place in large diameter piping. Sedimentation may take place in a tank, with the preferred embodiment being a conical bottom tank. In this latter case, the supernatant liquid may be of sufficient clarity to require no additional filtration or polish filtration with conventional filtration media such as a cartridge or bag filter. The accumulated sediment at the base of the conical bottom tank may be withdrawn and processed with the incoming latex waste at the beginning of the overall process or dewatered through a dedicated active filtration or other dewatering device.

In an additional embodiment, the clarified filtrate may be treated within the second filter or downstream thereof by a bed of activated carbon and/or ion exchange materials such as ion exchange resins to remove residual treatment chemicals and trace levels of deleterious metal ions such as copper and nickel.

It has been observed that the clarified filtrate may require pH adjustment with alkali or acid in order to meet specific influent requirements to the manufacturing process or for discharge to the POTW. This may be achieved in batch or continuous mode by conventional pH adjustment methods.

Step 50 of method 5, filtration of the floc from the waste latex liquid is performed following the formation of the floc. The filtration process may be performed by various known filters for separating solids to form a liquid stream, such as a drum filter, a centrifuge, and the like. However, the applicant has discovered that a particular low energy active filtration system is preferred for performing the filtering step 50 and dewatering step 60 of method 5. The filtration system may have one of two forms: a tower form, and a box form. The general principles of the filtration system are described and shown in U.S. Pat. No. 5,614,092 of DiLeo, the disclosure of which is incorporated herein by reference. The filter is comprised of a housing, a displaceable filter medium, and means for displacing the filter medium disposed between the housing and the displaceable filter medium. The preferred means for displacing the filter medium is comprised of a first set of one or more inflatable bladders, and a second set of one or more inflatable bladders. The bladders may be independently inflated by air (pneumatic) or by liquid (hydraulic) to apply compressive "squeezing" forces to the sludge, thereby "wringing" additional filtrate from it.

In one embodiment, apparatus 100 is comprised of a filtration module 200, which includes one or more of filtration systems such as systems 212, 214, and 216. One suitable tower form of the low energy active filter, also known as a SqueezeTower press (STp), is manufactured and sold commercially by Idee e Prodotti S.r.l. of Milan, Italy, and is marketed as Active Filtration™ by this company. In particular, the tower form is sold as the "Squeeze Box" model in Europe and Asia in a range of sizes having a housing or casing length between about 8 feet and about 20 feet and associated solids capacities of between about 3 cubic feet and about 8 cubic feet. This active filter is modular, such that multiple active filter units may be "ganged" together to make an overall filter system with high capacity.

This active filter is comprised of a base, a filter casing (also referred to herein as a housing) and a locking bonnet. The locking bonnet is provided with an inlet into the casing for receiving liquid with solids to be filtered that is supplied by a pump. The cylindrical filter casing contains the filter medium (typically a filter cloth) and inflatable bladders or tubes disposed between the casing and the filter cloth. The base is comprised of a releaseable hatch used to discharge the dewatered sludge, and a basin for the collection of the sludge. The filtering process takes place inside the cylindrical filter casing. Two sets of three bladders are inflated and deflated, thereby squeezing the accumulated sludge within the filter medium. The bladder inflation is controlled by the manually or by a programmable logic controller. The active filtration is carried out in three stages: loading the filter with liquid containing the solids, squeezing the solid sludge captured by the filter medium to dewater it, and separation and release of the dewatered solid from the filter medium, and release of it through the hatch at the bottom of the housing.

It will be apparent that other active filters may be used to achieve suitable results. A suitable active filter is generally comprised a housing, a displaceable filter medium, and means for displacing the filter medium, such means being disposed between the housing and the displaceable filter medium. The filter displacing means is preferably comprised of at least one, and preferably two sets of displacement actuators that can be operated to displace the filter medium such that it squeezes the sludge contained on the medium. A set of displacement actuators is comprised of at least one actuator, and preferably two or more actuators. Various actuators may be used to displace the filter medium, including but not limited to hydraulic or pneumatic cylinders, solenoid actuators, cams, and the like. Inflatable bladders are preferred actuators because they are easily integrated into the filter between the housing and the filter medium, and they are simple to operate.

In order to perform step 50 of method 5, i.e. the filtration of flocs from the liquid in vessel 150, apparatus 100 may be provided with a pump 152 for transferring the final floc-containing liquid from processing and feed vessel 150 to filtration module 200 or alternately by sealing the source vessel and moving by a pressure-driven transfer. Pump 152 is preferably a peristaltic or progressive cavity pump, or another pump that subjects the fluid being transferred to minimal shear. Filtration module 200 preferably includes one or more squeeze presses 212, 214, and 216, which in one preferred embodiment are "Squeeze Box" filtration systems. The squeeze presses 212/214/216 may be operated in sequence, with a first press receiving floc-containing liquid, then a second, and then a third receiving the liquid. Alternatively, the presses may be operated in parallel, with all of them receiving the floc-containing liquid. The flocs in the liquid are retained in the filter medium contained therein as a semi-solid sludge, while a first portion of filtrate is discharged into header 211. The first portion of filtrate is transferred to tank 250 via pump 222 for subsequent reuse as dilution water into vessel 130 via liquid conduit 252 or by gravity.

In a further embodiment, a polishing filter 230 may be used to capture any ultra fine particulate fillers that are not retained in the squeeze presses 212 et seq. The polishing filter renders the filtrate in tank 250 sufficiently pure to be discharged to a POTW as indicated by arrow 299, or reused in the manufacturing process as indicated by arrow 298. However, the polishing filter is not necessarily required to achieve the clarity and form required for discharge to the POTW or the reuse in the manufacturing process. One example of a suitable polishing filter is a Model SFM2 filter manufactured by the Omni-Filter Corporation of Delavan, Wis. The filter may be fitted with a polypropylene filter medium having a pore size rating of about 1 to 10 microns. The polishing filter may alternately be located on the discharge line from the dilution water tank, thereby only treating the filtrate requiring a high level of clarity.

After a volume of the liquid in vessel 150 has been filtered in one or more of squeeze presses 212/214/216, thereby producing sludge in the presses and a first portion of filtrate, step 60 is performed in which the sludge is dewatered. The filter bag (not shown) in squeeze press 212 is flexible, and is surrounded by a plurality of inflatable bladders as described and shown in the aforementioned U.S. Pat. No. 5,614,092 of DiLeo. The bladders are inflated with pneumatic or hydraulic pressure in a predetermined sequence, thereby forcibly squeezing the filter bag and the sludge contained therein, and dewatering the sludge into a sufficiently dry mass to be suitable for landfill disposal. A second portion of filtrate is discharged into header 211. The sludge in squeeze presses 214 and 216 are dewatered in a similar manner.

The active filter that is preferred in the present invention typically is comprised of two sets of bladders that forcibly displace the filter bag and the sludge contained therein. A first set of inflatable bladders performs the primary squeezing of the sludge, and a second set performs a secondary squeezing, and also assists in the detachment of the dewatered sludge from the filter medium and its discharge from the filter. Such an arrangement is disclosed in the aforementioned U.S. Pat. No. 5,614,092 of DiLeo.

Figure 3A:
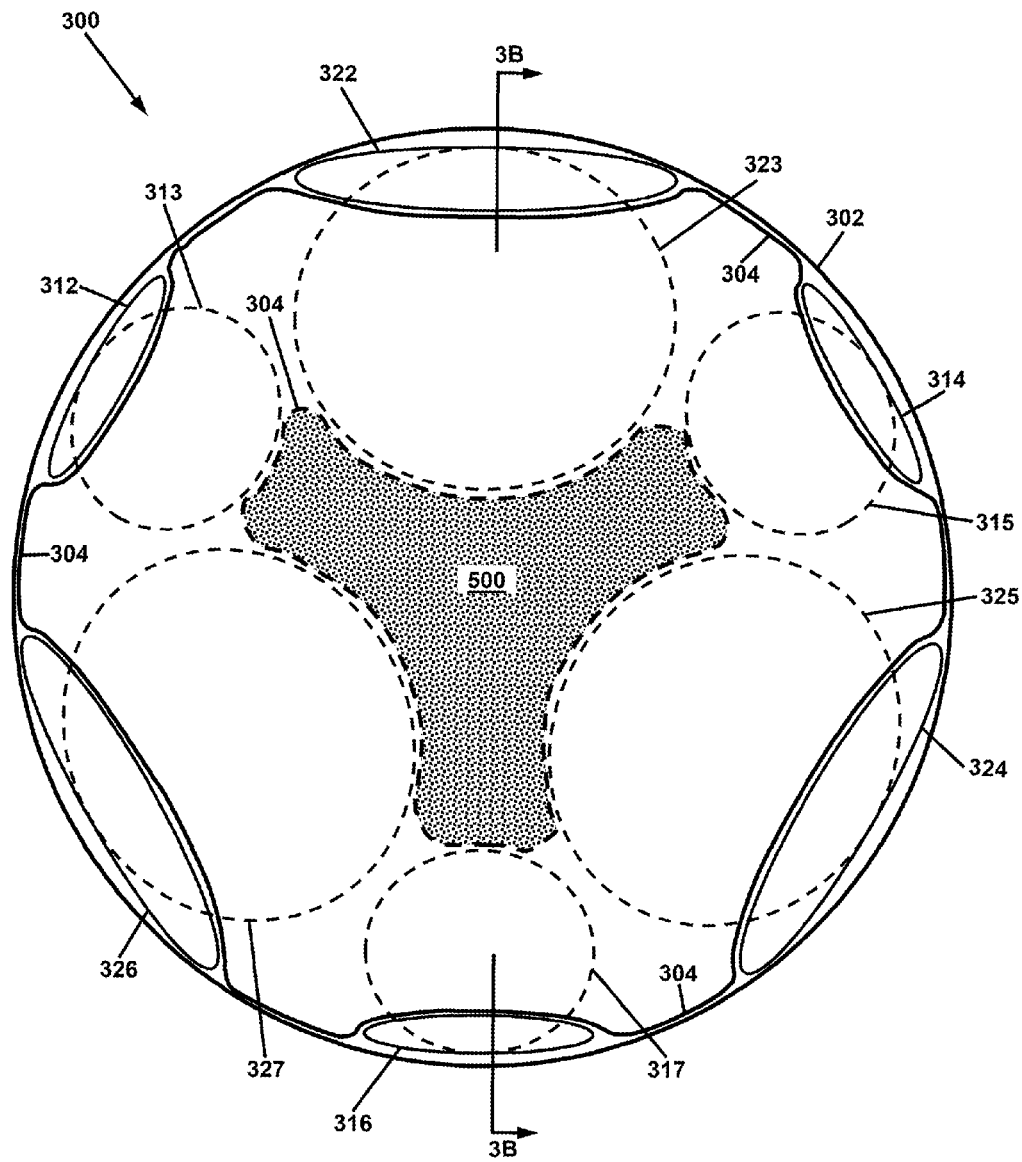
FIG. 3A is a schematic first cross-sectional illustration of one exemplary configuration of a preferred "tower" type filter that may be used in the present invention.

FIG. 3A is a schematic first cross-sectional illustration of one exemplary configuration of a tower-type active filter that may be used in the present invention, and FIG. 3B is a second cross-sectional illustration of the filter of FIG. 3A taken along the line 3B-3B of FIG. 3A. Filter 300 is comprised of a tubular housing 302, within which is disposed a filter bag 304. Primary bladders 322, 324, and 326, and secondary bladders 312, 314, and 316 are disposed between elongated tubular bag 304 and the inner surface of tubular housing 302, and are shown in their deflated states. When the primary bladders are hydraulically or pneumatically pressurized and brought to their inflated states 323/325/327, and the secondary bladders are pressurized and brought to their inflated states 313/315/317, the filter bag is deformed inwardly, and squeezing pressure is applied to the sludge contained therein, thereby dewatering the sludge to form sludge cake 500. It will be apparent that the number of sets of primary and secondary bladders may be two, rather than three, or four or more.

The inflation and deflation of primary bladders 322/324/326 and secondary bladders 312/314/316 are controlled by means for actuating them, such as a reservoir of fluid (not shown) in communication with them. Each bladder is preferably individually controllable, as shown in FIG. 3B. Inlet/exhaust valves 332 and 334, controlled by programmable logic controller 330, enable inflation and deflation of respective bladders 316 and 322.

Filter 300 may be operated in a simple sequence wherein primary bladders 322/324/326 are pressurized, and then secondary bladders 312/314/316 are pressurized to dewater the sludge. The applicant has discovered that for the liquid latex waste described herein to be most effectively dewatered to a state suitable for disposal of recycling into useful products, it is desirable to operate the bladders in a cyclic manner, and more preferably, with sequenced inflation. For example, the filter may be filled with final floc-containing liquid latex waste with all of the bladders partially (stabilization) inflated, and then the primary bladders may be further, i.e. "pressing" inflated, followed by the secondary bladders, and then repeatedly followed by the pressing inflation of the primary and then the secondary bladders. The order of the bladder inflation may be reversed, i.e., the secondary bladders may be inflated first, followed by the primary bladders.

It is also preferable but not critical that the filter is not filled to its maximum capacity in the initial filling, and that squeezing cycles are interspersed with further filling cycle or cycles. Additionally, the individual sets of bladders 312/314/316 and 322/324/326 may be inflated in sequence, rather than simultaneously. FIG. 5 is a schematic illustration of a portion of a sludge squeezing operation using the SqueezeTower press filter of FIGS. 3A and 3B. "Time zero" is the point at which the squeezing operation begins. The first filling cycle 305 occurs prior to time zero. In the first filling cycle, sufficient final floc waste latex liquid is added to provide about 50 to 90 percent of the solid capacity of the filter, rather than filling it to maximum capacity. During the filling cycle, the bladders are pressurized to a relatively low background "stabilization" pressure 311.

After the first filling cycle 305, the secondary bladders 313/315/317 are inflated, and some initial dewatering of the sludge occurs. In the embodiment depicted in FIG. 5, the secondary bladders are inflated simultaneously, but a sequenced inflation may also be performed. The secondary bladders are then deflated. After a brief time delay, primary bladder 322 is inflated (323), and then deflated; primary bladder 324 is inflated (325) and then deflated; and then primary bladder 326 is inflated (327) and then deflated. Subsequently, the primary bladder inflation sequence is repeated. Typically the inflation cycle of any one or all of the bladders may overlap each other. (In order to more clearly depict the individual inflation of each of the bladders, such overlap is not shown in FIG. 5.)

Then a second filling 307 is performed in which additional final floc waste latex liquid is added to filter 300. The squeezing sequence of secondary and primary bladders is then repeated. This sequence may be followed by additional filling and squeezing sequences until filter 300 has reached its maximum solids capacity.

The cyclical bladder inflations and filling sequences are preferred because the resulting sludge is dewatered more thoroughly, and the resulting latex solid 500 is more easily handled in a disposal operation. Alternatively, solid 500 may be used as a raw material product that may be further processed into an end product. (For example, the resulting latex solid 500 may be blended into another polymer to form a composite material useful in such applications as plastic fencing and decking that are otherwise often fabricated with "pressure treated" wood, which contains arsenic. Alternatively, the dewatered sludge may be further process and used as a filler material for such construction materials as concrete, paint, caulk fillers, surface coatings, etc. Alternatively, the resulting latex solid 500 may be used as a combustible material to be utilized as a supplemental or primary fuel in combustion equipment.) While a single filter filling and squeeze dewatering by all of the bladders may result in a viscoelastic sludge that is difficult to handle, sludge processed according to the filter operation of the present invention forms a detackified latex solid that is much easier to handle. In some instances, the latex solid 500 will "self-discharge" from the filter, falling out of the filter as a solid "log." Referring again to FIG. 3B, filter 300 may be provided with a bottom hatch 336, which may be opened to enable discharge of the solid 500 into a receiving container 338. It will be apparent that receiving container 338 may be shaped and positioned with respect to filter 300 other than shown, to enable the discharge of the solid 500 as a log, or as large or small chunks.

In an additional embodiment, the tower type active filter may discharge the solids into a box-type active filter, such as a DryBox, or another open dewatering device. On occasion, the applicant has observed the presence of free water in the collected mass of dewatered solids from the tower type active filter that may have been trapped at the base of the tower or interspersed within the dewatered solids in the tower at the end of the dewatering cycle. By discharging into the box type filter, the free water may be quickly drained off, providing a very high solids content byproduct for disposal or further processing. An elevating grit screw conveyor is one example of an alternative open dewatering device.

Table 1 shows a more detailed exemplary sequence of filling and bladder pressurization cycles to be used in the operation of a tower-type active filter. The active filter is preferably a "Squeeze Box" as described previously herein, having a capacity of about 1 to 1.3 cubic feet of dewatered sludge per meter of tower height. Feeding of the final floc containing liquid at about 5 weight percent solids is performed with a peristaltic or progressive cavity pump or pressure transfer as describe previously herein. It is to be understood that the sequence of filling and bladder pressurization in Table 1 is meant to be exemplary and not limiting, and that variations in the exact sequence may occur, while still achieving a satisfactory dewatering of the latex sludge to produce the waste latex solid.

TABLE 1

EXEMPLARY SEQUENCE OF STEPS IN SQUEEZETOWER PRESS OPERATION

| STEP # | DESCRIPTION | ACTIVE BLADDER | BLADDER PRESSURE (BAR) | DELAY TIME (SEC) | ON TIME (SEC) | OFF TIME (SEC) |
|---|---|---|---|---|---|---|
| A | | FIRST FILLING AND DEWATERING | | | | |
| 1 | Initial filling of filter for 10 to 15 Min | all at stabilization pressure | about 1 to 2 | | | |
| 2 | Secondary bladder squeeze | 313/315/317 | about 6 to 8 | 0 | 210 | 210 |
| 3 | Primary bladder squeeze | 323 | about 6 to 8 | 45 | 150 | 120 |
| 4 | Primary bladder squeeze | 325 | about 6 to 8 | 75 | 150 | 120 |
| 5 | Primary bladder squeeze | 327 | about 6 to 8 | 90 | 150 | 120 |
| | TOTAL DURATION | Pressing | | | 10-15 Min | |
| B | | SECOND FILLING AND DEWATERING | | | | |
| 1 | 2nd filling of filter for 5 to 10 Min | all at stabilization pressure | about 1 to 2 | | | |
| 2 | Secondary bladder squeeze | 313/315/317 | about 6 to 8 | 0 | 210 | 210 |
| 3 | Primary bladder squeeze | 323 | about 6 to 8 | 45 | 150 | 120 |
| 4 | Primary bladder squeeze | 325 | about 6 to 8 | 75 | 150 | 120 |
| 5 | Primary bladder squeeze | 327 | about 6 to 8 | 90 | 150 | 120 |
| | TOTAL DURATION | Pressing | | | 10-15 Min | |
| C | | DEWATERING PRESSING | | | | |
| 1 | Secondary bladder squeeze | 313/315/317 | about 6 to 8 | 0 | 510 | 510 |
| 2 | Primary bladder squeeze | 323 | about 6 to 8 | 45 | 180 | 180 |
| 3 | Primary bladder squeeze | 325 | about 6 to 8 | 75 | 180 | 180 |
| 4 | Primary bladder squeeze | 327 | about 6 to 8 | 90 | 180 | 180 |
| | TOTAL DURATION | Pressing | | | 25 to 30 Min | |
| D | | COMPACTION PRESSING | | | | |
| 1 | Secondary bladder squeeze | 313/315/317 | about 6 to 8 | 0 | 510 | 510 |
| 2 | Primary bladder squeeze | 323 | about 6 to 8 | 45 | 210 | 210 |
| 3 | Primary bladder squeeze | 325 | about 6 to 8 | 75 | 210 | 210 |
| 4 | Primary bladder squeeze | 327 | about 6 to 8 | 90 | 210 | 210 |
| | TOTAL DURATION | Pressing | | | ~45 Min | |
| E | | DISCHARGE | | | | |
| 1 | Secondary bladder squeeze | 313/315/317 | about 6 to 8 | 0 | 210 | 1500 |
| 2 | Primary bladder squeeze | 323 | about 6 to 8 | 210 | 300 | 1500 |
| 3 | Primary bladder squeeze | 325 | about 6 to 8 | 510 | 300 | 1500 |

TABLE 1-continued

EXEMPLARY SEQUENCE OF STEPS IN SQUEEZETOWER PRESS OPERATION

| STEP # | DESCRIPTION | ACTIVE BLADDER | BLADDER PRESSURE (BAR) | DELAY TIME (SEC) | ON TIME (SEC) | OFF TIME (SEC) |
|---|---|---|---|---|---|---|
| 4 | Primary bladder squeeze | 327 | about 6 to 8 | 810 | 300 | 1500 |
|  | TOTAL DURATION | Discharge |  |  | ~45 Min |  |

The process example shown in Table 1 includes the general steps of:
A. Filling the active filter with a first portion of latex waste containing liquid, and dewatering the resulting collected sludge;
B. Delivering a second portion of latex waste containing liquid into the active filter, and dewatering the collected sludge therein (it is noted that the second filling may be optional and additional small incremental fillings may be optional as well dependant upon the waste);
C. Further dewatering the sludge in the active filter;
D. Further compacting the sludge in the S active filter; and
E. Further working the sludge in the active filter, ultimately to a point where the sludge is formed into an elongated "log" that detached from the filter bag and is discharged from an opening in the bottom of the press.

It can be seen from Table 1 that the dewatering, compacting, and working of the sludge to form a waste latex solid is performed by the intermittent operation of the various primary bladders 323/325/327 and secondary bladders 313/315/317 as indicated.

Without wishing to be bound to any particular theory, the applicant believes that a significant factor in the success of the chemical regimen plus the gentle handling of the floc in the process vessels and/or piping, is the gentle manipulation of the floc within the separation equipment by the displaceable bladders. Alternate means of gentle manipulation and disruption of the solids cake in the squeeze presses 212 et seq. will have the same result and are considered within the scope of the present invention. It is noted that a flexible diaphragm filter press (FDFP) may offer similar dynamic action on the sludge. However, the FDFP does not reliably and consistently automatically completely discharge the sludge and restart, and its use is highly labor intensive. Nor does the FDFP offer the ability to manipulate the sludge cake in an automated and alternating manner with variations in the sequences of pressures, bladders, etc.

The applicant has discovered that in the processing of latex waste, the performance of the active filter is sensitive to over pressurizing the dewatered latex solids contained therein, and "over feeding" the unit, i.e. delivering too much volume of liquid containing the final floc into it in a single filling cycle. Packing of the filter has been experienced on occasion under these conditions. The extent of the problems as they relate to various latex materials will vary to some degree.

If too much solid mass is fed to the active filter, or if the press time is too long, or if the reagent(s) have been inadequately mixed with the waste latex-containing liquid, the sludge may become lodged in the active filter and may require manual manipulation of the controls in order to discharge the solid latex waste cake therein. This phenomenon appears to take place when conditions are present to cause the filter cake to exceed 90 weight percent dry solids. Although the process does not fail, the process must be interrupted, and the particular batch must be completed through manual intervention in the control system. This is considered to be disadvantageous. The applicant's method of controlling all upstream processes to provide a consistent concentration and treatment and the intermittent filling of the active filter, and the intermittent and specifically sequenced inflation and deflation of the bladders therein avoid these problems and provide superior results. The dewatered solid waste latex is easier to handle, and is more suited to disposal or recycling into another product.

In an alternative embodiment, the one or more dynamic filtration systems 212/214/216 are provided in box form (instead of tower form), as box-shaped containers disposed on a rack 210.

Each of the containers may comprise a removable filter medium which is removable and transportable by a fork lift or other suitable means. Each of the box-shaped containers are provided with a liquid filtrate outlet connectable to header 211, a plurality of inflatable bladders or tubes disposed along the horizontal side walls and the bottom of the box, and a filter bag dimensioned to be contiguous with the inflatable bladders and to cover the walls and bottom of the box.

FIG. 4 is a schematic cross-sectional illustration of a suitable "box" type filter. Box filter 350 is comprised of a box-shaped housing 352 having a bottom wall 354 and a surrounding side wall 356, a displaceable filter bag 358 disposed within housing 352. Filter 350 is further comprised of bottom inflatable bladder 360, side inflatable bladders 362 and 364 disposed along side wall 356, and two additional side inflatable bladders (not shown) disposed along the end portions (not shown) of side wall 356.

The bladders 360, 362, and 364 (and the additional bladders not shown) are individually inflatable and deflatable through respective valves 366, 368, and 370, which are controlled by programmable logic controller 330 or other appropriate control device. The profiles of the inflated bladders are indicated by dotted curves 372, 374, and 376, resulting in the inwardly squeezed filter bag 359 and dewatered solids therein (not shown). Outlets 378 permit the drainage of filtrate from housing 352. The respective bladders may be operated sequentially as described previously herein for filter 300 of FIGS. 3A and 3B. Alternatively, for large box filters having a relatively low height compared to length and width, the filter 350 may be provided with a single displacement actuator comprising only a bottom bladder 360 that is configured to extend upwardly along a portion of the surrounding side wall 356.

Filter 350 is preferably further comprised of a support basket 380 which contains and supports filter bag 358 and any accumulated sludge therein. Support basket may be provided with eyes 382 for engagement with the forks of a forklift for easy removal of filter bag 358 and dewatered sludge therein, and subsequent replacement of filter bag 358.

One preferred mobile box filter for filtering the flocs and dewatering sludge is the "Dry Box 200" filtration system manufactured and sold commercially by Idee e Prodotti S.r.l. This filter is provided in a standard size 900 mm long by 600 mm wide by 950 mm high, and is comprised of four parts:

- An internal basket is made of AISI 304 stainless steel or AISI 316 stainless steel. The basket supports the filter bag and an "active filtration system," and includes a lifting bar that can be maneuvered with a fork lift truck.
- The active filtration system, which is installed on top of the basket and is comprised of air tubes (referred to herein as inflatable bladders) linked to an electric control panel for ON-OFF actuation (i.e. inflation and deflation) via a pneumatic system.
- An open box-shaped housing that contains the filtering structure and collects the processed liquid, which is then discharged outside through a pipe connection, and a filter bag (referred to herein as a filter medium) that can be replaced at the end of each cycle by an operator.

The filtration process takes place inside the container. Sludge is loaded from the top, either falling into the box or being pumped in by means of a feed pump. It is contained and initially filtered by the force of gravity by the filter cloth, and then by active filtration wherein the bladders are inflated and deflated to squeeze and/or disrupt and thereby further deliver filtrate from the sludge. The liquid filtrate is then piped outside through a coupling. Once the solid sludge within the filter is no longer discharging filtrate, the operator removes the basket holding the filter bag containing the dewatered sludge (typically by means of a fork lift) and then refits the dry box filter with a new filter bag in the basket. The "DryBox 200" may also be constructed into a fork truck handled self dumping hopper lieu of the rigid stainless steel box for easier material handling and solids discharge.

In order to perform step 50 of method 5 using box form filtration, pump 152 delivers a batch of final floc-containing liquid from processing and feed vessel 150 to the one or more box filtration systems 212, 214, and 216, which in this embodiment preferably are "Dry Box 200" filtration systems, or the equivalent thereof. The box filtration systems 212/214/216 may be operated in sequence, with a first box receiving floc-containing liquid, then a second, and then a third receiving the liquid. Alternatively, the boxes may be operated in parallel, with all of them receiving the floc-containing liquid.

The flocs in the liquid are retained in the filter medium contained therein as a semi-solid sludge, while a first portion of filtrate flows through the filter medium by the force of gravity and is discharged into header 211. The first portion of filtrate is transferred to tank 250 via pump 222 for subsequent reuse as dilution water into vessel 130 via liquid conduit 252. A polishing filter 230 may be used to further purify the filtrate as described previously herein.

After a volume of the liquid in vessel 150 has been filtered in one or more of box filtration systems 212/214/216, thereby producing sludge in the boxes and a first portion of filtrate, step 60 is performed in which the sludge is dewatered. The filter bag (not shown) contained in box system 212 is flexible. The bladders are inflated, thereby forcibly displacing the filter bag and the sludge cake contained therein in a manner that causes cracks in the sludge cake. These cracks function as additional drainage channels for the remaining filtrate contained in the cake, resulting in the drainage of a second portion of filtrate from the cake. As a result of this additional dewatering of the sludge cake, the sludge is dewatered into a sufficiently dry mass to be suitable for its intended disposition. The second portion of filtrate is discharged into header 211. The bladders may be cycled through multiple inflation and deflation cycles as described previously herein to manipulate the sludge cake, compressing and/or disrupting it to form cracks, such that additional portions of filtrate are discharged. The sludge in box filtration systems 214 and 216 are dewatered in a similar manner.

Following the initial fill of and dewatering of the dry box, a second fill of the identical format will take place. Subsequent fills will proceed until the desired volume of final floc containing liquid has been added to the box in order to achieve the desired final total dry matter. The sludge in the box will dewater to a level that is naturally occurring through the separation process. This embodiment of the process will allow for dewatering to occur over about 16 to 20 hours to achieve a sludge containing negligible free water.

The level of percent solids is directly proportional to the dewatering time provided for the cake. Given sufficient dewatering time (typically in the range of days, the sludge will dewater to an air dry state. The addition of the PAC will form a marginally dewaterable floc and similarly, the addition of only the cationic polymer will provide a more dewaterable floc than the PAC alone. Optimum performance is achieved with the three part chemical reagent system as proposed.

Although the applicant's chemical treatment of the waste latex containing liquid described herein is preferred prior to performing the filtration process described herein, alternate flocculation chemical regimens are known to form a suitably dewaterable latex sludge. Such regimens may provide for acceptable filtration functionality within the active filters such as the DryBox, or potentially in the SqueezeTower press. However, the throughput, the level of solids in the dewatered cake, the ability to remove or otherwise process the solid waste latex cake, and the clarity of the filtrate may be poorer than with the proposed chemical reagent regimen of the present invention. Nonetheless, the handling of the flocs and the manipulation of the latex sludge following treatment by any chemical regimen, according to the methods of operating the "Active Filtration" equipment described herein are considered within the scope of the apparatus and methods of the present invention for producing a dewatered sludge comprised of latex or other materials.

Each of the two dynamic filtration forms has certain advantages. The tower form is advantageous in that it provides a more dewatered sludge, on the order of about 50 weight percent to about 80 weight percent solids or higher, while the box form provides a sludge of about 30 weight percent to about 50 weight percent solids or higher. The box form is advantageous in that the dewatered sludge contained therein is easily removed by virtue of the disposable filter bag contained in the box being configured for removal by a fork lift, and subsequently packed in a portable box for disposal at a landfill or alternate disposition. In addition, the box-type filter is more effective in separation of sludge that has undergone lesser upstream processing due to its lower pressure applied to the sludge against the face of the filter cloth; fewer fines are forced through the filter medium when using a box-type filter. For processes that produce large volumes of waste latex-containing liquid, the use of larger box filters may be advantageous. For example, certain models of the aforementioned DryBox units of Idee e Prodotti that are available in 8, 10, 15, 20, 30 and 40 cubic yard sizes may be suitable. By providing multiple units, this will allow for much larger volumes being treated in a single vessel and may provide for longer dewatering periods, in terms of days, to achieve a higher level weight percent solids.

An Exemplary Design of an Apparatus of the Present Invention

The following description of one designed embodiment of the applicant's waste treatment apparatus is meant only to be exemplary and not limiting.

In one proposed design of the instant apparatus 100, the wash totes may be provided with a 300 gallon capacity, and may be filled to about 275 to 300 gallons with waste latex liquid. The latex concentration in the wash totes are typically in the range of about 5 to 30 weight percent solids, but may be as much as about 70 weight percent solids. The instant apparatus will be capable of processing approximately 2500 gallons of waste latex liquid. Vessels 130, 150, and 250 will be made of polyethylene, with capacities of about 2000 gallons. Two storage rack systems will be provided with capacity for up to ten 300 gallon wash totes, three chemical reagent totes and twelve 1.5 cubic yard box filtration systems.

Totes will be accumulated on a vertical tote staging rack at the edge of the processing area. The rack will be designed to stage 10 totes at one time. The rack will contain a piping header that is located to connect to the drain valve of the totes. A rinse water supply header will be located above the tote positions with a manually retractable rinse water spray head located above each tote position. The spray heads will be fitted with an appropriate flexible hose to easily inter the totes. Each will also be fitted with an appropriate flexible splash shield to prevent rinse water from exiting the tote.

Totes will be placed in the rack by a process operator from the side opposite from the processing area. Totes will be loaded such that the operator will always have at least five filled totes available for processing at all times. Totes will be placed with the drain nozzle positioned toward the processing area. The staging rack will be designed with personnel platforms for the operator to safely and easily access the top tote cap and the tote drain valve of all totes.

Empty box filtration systems, preferably Idee e Prodotti DryBox 200 Units (DBU's), will be staged on a vertical staging rack at the edge of the processing area. The DBU's will be 1.5 cubic yard latch release dump style hoppers fitted for fork truck transporting. The rack will be designed to stage 10 DBU's at one time. The rack will contain a piping header that is located to connect to the drain valve of the DBU's. A treated sludge supply header will be located above the each DBU positions with a manually retractable delivery nozzle. The delivery nozzles will be fitted with an appropriate flexible hose to easily enter the DBU's. Each will also be fitted with an appropriate flexible splash shield to prevent the sludge from exiting the DBU.

DBU's will be placed in the rack by a process operator from the side opposite from the processing area. DBU's will be loaded such that the operator will always have at least five empty DBU's available for filling at all times. DBU's will be placed with the drain nozzle positioned toward the processing area. The staging rack will be designed with personnel platforms for the operator to safely and easily access the top of each DBU and the drain valve of all DBU's.

The operator will connect the drain lines of two to three DBU's at one time to a collection header on the processing side of the staging rack. This connection will be fitted with a valve and Kamlock style fitting on the collection header and a flexible hose that will connect to the drain valve on the DBU. Prior to loading the Dry Boxes into the rack, the operator will have installed the disposable filter cloths in each.

The operator will open the top cap on each tote and connect the drain lines of two to three totes at one time to a collection header on the processing side of the staging rack. This connection will be fitted with a valve and Kamlock style fitting on the collection header and a flexible hose that will connect to the drain valve on the tote.

The totes will be drained empty via a pump, by the operator into the 2000 gallon Dilution and Primary Treatment tank. Once the set of totes for a given batch are empty the operator will lower the rinse water spray head into the opening in the top of each empty tote. The operator will start a timed automatic rinse sequence through the control system. The rinse sequence will provide alternating spraying and pump down cycles that will be optimized to satisfactorily clean the totes. The rinse water will be reclaimed water from previously dewatered waste.

Once the totes are emptied and rinsed the operator will retract the spray heads and disconnect the tote from the collection header. Following a predetermined mixing time the dilution tank will be then be sampled by the operator and tested for percent solids. Reclaimed water will be added to adjust the tank to the required solids concentration for processing. This will be done through a Programmable Logic Controller (PLC) program. The operator will enter the dilution tanks weight percent solids and volume into a program on the work station in communication with the PLC. The program will calculate and provide to the operator the amount of water required. The operator will set the control system to add the appropriate amount of water and the controls will add the water automatically and record the water additions and total batch volume.

Following the dilution step the operator will initiate the chemical addition sequence. Based upon the total dilution tank volume, the control system will add the appropriate amount of each chemical in the appropriate order with the required mixing time and mixer speed for each reagent.

Following the addition and initial mixing of the reagents, the contents of the dilution tank will be transferred to the 2000 gallon Processing and Fee (P&F) tank. Additional reagents additions and mixing time will be automatically accommodated in the P&F tank. Once the P&F Tank is ready, the Control System will be ready for transfer to the DryBox units.

The operator will initiate the transfer sequence from the P&F tank to the Dry Boxes through the control system. The control system will feed the treated sludge at the required feed rate to the DBU stations. Any additional in line reagent additions to the sludge will be controlled through the control system the transfer.

As the sludge is transferred to the DBU's, the filtrate, also known as supernatant liquid, will drain off from the DBU's and be collected by the drain header. This drain header will discharge to a small collection tank mounted on the floor near the DBU staging rack. The supernatant liquid will be pumped from the collection tank to the Reclaim/Dilution Water Tank. From the Reclaim/Dilution Water Tank a portion of the supernatant liquid will be reused for rinsing of totes or for dilution of the sludge in the Dilution and Primary Treatment tank. The balance of the supernatant liquid will be pumped to the plant's industrial sewer connection.

The DBU's will dewater for between about 18 hours to about 48 hours. Once the free water has been drained from the sludge in the DBU's a process operator will remove each DBU from its position on the staging rack and transport it to the location of the disposal containers. The disposal containers are to be one cubic yard size corrugated boxes with poly liners. At the disposal containers the dewatered sludge is to be dumped into the liner within a disposal container. The operator will have inserted the liner into the container in advance. The operator will close up and seal the ploy liner and close up and seal the container. A process operator will load the disposal containers into a truck for final disposal.

Alternatively, the small totes of latex waste may be replaced by a larger storage vessel. Emptying, cleaning and other similar operations would be integrated. Similarly, the small DryBoxes may be replaced with a single or multiple SqueezeTower presses or a single or multiple large DryBox units.

In an addition to this embodiment the active filter (preferably a STp) may discharge the solids into a DryBox or other open dewatering device. On occasion the applicant has observed the presence of free water in the collected mass of dewatered solids from the active filter that may have been trapped at the base of the tower housing. By discharging into the DryBox, the free water may be quickly drained off, providing a very high solids content byproduct for disposal or further processing. An open dewatering device such as an elevating grit screw conveyor would be a sample of an alternate open dewatering device.

It is, therefore, apparent that there has been provided, in accordance with the present invention, a method and apparatus for treating a liquid volume containing latex waste. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for treating a liquid containing waste latex, the method comprising:
   a. providing a treatment apparatus comprising at least a first vessel, and a filtration system in liquid communication with the first vessel;
   b. delivering a portion of the liquid containing waste latex at a concentration of at least 3 weight percent solids to the first vessel;
   c. adding a first reagent to the portion of liquid containing waste latex to cause the formation of waste latex flocs of a first size;
   d. adding a second reagent to the portion of liquid containing waste latex to cause growth of the waste latex flocs of the first size into separable waste latex flocs;
   e. separating the separable waste latex flocs within the filtration system into a waste latex sludge and a first filtrate; and
   f. dewatering the waste latex sludge to produce a waste latex solid and a second filtrate, wherein the filtration system is comprised of a first filter including a housing, a displaceable filter medium, and first and second sets of displacement actuators disposed between the housing and the displaceable filter medium, and wherein a first portion of dewatering the waste latex sludge is performed by manipulating the sludge by actuating the first set of displacement actuators, and a second portion of dewatering the waste latex sludge is performed by manipulating the sludge by actuating the second set of displacement actuators.

2. The method as recited in claim 1, wherein the first reagent is polyaluminum chloride, and the second reagent includes a cationic polymer.

3. The method as recited in claim 2, further comprising adding a third reagent to the portion of liquid containing waste latex flocs to cause further stability of the separable waste latex flocs.

4. The method as recited in claim 3, wherein the third reagent includes an anionic polymer.

5. The method as recited in claim 1, wherein the first vessel is comprised of an elongated pipe through which flows the portion of the liquid containing waste latex, and wherein the first reagent is continuously injected into the elongated pipe.

6. The method as recited in claim 1, wherein the first vessel is comprised of a tank, the portion of the liquid containing waste latex is delivered to the tank as a batch, and wherein the first reagent is delivered to the tank and mixed with the portion of the liquid containing waste latex.

7. The method as recited in claim 1, wherein in dewatering the waste latex sludge, the first displacement actuators are maintained in an actuated state while the second portion of dewatering the waste latex sludge is performed by actuating the second set of displacement actuators.

8. The method as recited in claim 1, wherein the dewatering the waste latex sludge is performed by first actuating the first displacement actuators, maintaining the first displacement actuators in an actuated state while actuating the second displacement actuators, then de-actuating the first and second displacement actuators, and again first actuating the first displacement actuators, maintaining the first displacement actuators in an actuated state while actuating the second displacement actuators, then de-actuating the first and second displacement actuators.

9. The method as recited in claim 1, wherein the first and second sets of displacement actuators are first and second sets of inflatable bladders.

10. The method as recited in claim 1, wherein the filtration system is further comprised of a second filter in fluid communication with the first filter to receive the first and second filtrates, and the method further comprises further filtering the first and second filtrates with the second filter.

11. The method as recited in claim 10, wherein the second filter is a polishing filter for removing fine solid particles from the first and second filtrates.

12. The method as recited in claim 10, wherein the treatment apparatus is further comprised of a bed of activated carbon in liquid communication with the first filter.

13. The method as recited in claim 10, wherein the treatment apparatus is further comprised of a bed of ion exchange material in liquid communication with the first filter.

14. The method as recited in claim 1, wherein separating the separable waste latex flocs within the filtration system into a waste latex sludge and a first filtrate and dewatering the waste latex sludge to produce a waste latex solid and a second filtrate is performed by delivering a first amount of the liquid containing separable waste latex flocs into the filter, dewatering the sludge from the first amount of liquid by actuating the first and second sets of displacement actuators, and then delivering a second amount of the liquid containing separable waste latex flocs into the filter, and dewatering the sludge from the second amount of liquid by actuating the first and second sets of displacement actuators.

15. The method as recited in claim 1, further comprising handling the flocs of the first size at sufficiently low shear rates to prevent the redispersion of the flocs into the liquid.

16. The method as recited in claim 1, further comprising handling the separable waste flocs at sufficiently low shear rates to prevent size reduction of the separable waste flocs.

17. A method for treating a liquid containing waste latex, the method comprising:
   a. delivering the liquid from a source continuously through a first elongated pipe while adding a first reagent to the liquid containing waste latex to cause the formation of waste latex flocs of a first size;
   b. delivering the liquid containing waste latex flocs of the first size from the first elongated pipe into a second elongated pipe while adding a second reagent to the liquid containing waste latex flocs of the first size to cause growth of the waste latex flocs of the first size into separable waste latex flocs;

c. delivering the liquid containing separable waste latex flocs from the second elongated pipe at low shear conditions to prevent size reduction of the separable waste latex flocs, into a filtration system comprised of a first filter including a housing, a displaceable filter medium, and first and second sets of displacement actuators disposed between the housing and the displaceable filter medium;

d. separating the separable waste latex flocs within the filtration system into a waste latex sludge and a first filtrate;

e. performing a first portion of dewatering the waste latex sludge by manipulating the sludge by actuating the first set of displacement actuators, and performing a second portion of dewatering the waste latex sludge by manipulating the sludge by actuating the second set of displacement actuators to produce a waste latex solid and a second filtrate.

18. The method as recited in claim 17, wherein in dewatering the waste latex sludge, the first displacement actuators are maintained in an actuated state while the second portion of dewatering the waste latex sludge is performed by actuating the second set of displacement actuators.

19. The method as recited in claim 17, wherein the dewatering the waste latex sludge is performed by first actuating the first displacement actuators, maintaining the first displacement actuators in an actuated state while actuating the second displacement actuators, then de-actuating the first and second displacement actuators, and again first actuating the first displacement actuators, maintaining the first displacement actuators in an actuated state while actuating the second displacement actuators, then de-actuating the first and second displacement actuators.

20. The method as recited in claim 17, wherein separating the separable waste latex flocs within the filtration system into a waste latex sludge and a first filtrate and dewatering the waste latex sludge to produce a waste latex solid and a second filtrate is performed by delivering a first amount of the liquid containing separable waste latex flocs into the filter, dewatering the sludge from the first amount of liquid by actuating the first and second sets of displacement actuators, and then delivering a second amount of the liquid containing separable waste latex flocs into the filter, and dewatering the sludge from the second amount of liquid by actuating the first and second sets of displacement actuators.

21. The method as recited in claim 17, wherein the liquid containing waste latex is provided at a concentration of at least 3 weight percent solids of waste latex.

22. The method as recited in claim 17, wherein the delivering the liquid containing separable waste latex flocs from the second elongated pipe at low shear conditions are performed using at least one peristaltic pump.

* * * * *